United States Patent [19]
Shakra et al.

[11] Patent Number: 5,095,450
[45] Date of Patent: Mar. 10, 1992

[54] GRAPHIC PLOTTING NETWORK METHODS AND APPARATUS

[75] Inventors: Farid J. Shakra, Cupertino; David M. Emmett, Palo Alto; David W. Schneider, San Jose, all of Calif.

[73] Assignee: Oce Graphics USA Inc., Mountain View, Calif.

[21] Appl. No.: 595,653

[22] Filed: Oct. 9, 1990

Related U.S. Application Data

[63] Continuation of Ser. No. 347,877, May 5, 1989, abandoned.

[51] Int. Cl.[5] ............................................. G06K 15/00
[52] U.S. Cl. ...................................... 395/114; 358/443
[58] Field of Search ................................ 364/518–520, 364/919.5 MS, 919 MS, 929.3 MS, 237.3 MS, 235 MS, 930 MS; 358/443, 450, 462, 442, 434

[56] References Cited

U.S. PATENT DOCUMENTS 4,843,571 6/1989 Notermans et al. ................ 364/519

*Primary Examiner*—Arthur G. Evans
*Attorney, Agent, or Firm*—Bruce D. Riter

[57] ABSTRACT

Graphic plotting network methods and apparatus are disclosed for connecting one or more video signal sources, such as computer workstations and/or RGB cameras, to a single plotter. In a preferred embodiment, a video chain unit (VCU) is connected to each of the sources for receiving analog video and/or digital serial and/or digital parallel information, and the VCUs are interconnected in series with one another and with a video processing unit (VPU) which is in turn connected to the plotter. The interconnection is made in series such that any VCU may communicate with the VPU even if other VCUs in the chain are powered off and such that the VPU (and the plotter) can be placed anywhere in the chain. Each VCU has a set of switches for setting the plot parameters, for acquiring a plot, for repeating a plot, and for aborting a plot in process, and an indicator to show when the plotter is ready to acquire a plot. Also in a preferred embodiment, a "handshake" communication is carried out between a transmitting VCU and the VPU during a video blanking interval. The VCU transmits to the VPU a command and identification signal identifying the VCU and indicating that the VCU is ready to transmit a video signal representing an image to be plotted, the VPU replies with a command signal commanding transmission of the video signal, and the VCU then transmits the video signal to the VPU. The command signal preferably echoes the identification signal and includes a signal indicative of a sequence in which one or more components of the video signal are to be transmitted. The VCU preferably also transmits to the VPU a signal representing plot parameters and/or a signal representing a number of copies of the image to be plotted. The video signal is converted at the VPU to a form recognizable by the plotter, for example, a bit map of the image to be plotted.

16 Claims, 31 Drawing Sheets

GRAPHIC PLOTTING NETWORK METHODS AND APPARATUS

This application is a continuation of application Ser. No. 07/347,877, filed May 5, 1989, now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The invention relates to a network and methods for connecting multiple computer workstations to a color graphics plotter, particularly to a color thermal graphics plotter.

2. Related Art

Micro-computers and workstations have become commonplace in many work environments, especially engineering work environments. Such devices typically include a graphics driver circuit which produces video signals capable of being displayed in full color on a display screen, or monitor. The video signals may be in any of a variety of formats, but typically include a set of analog signals conveying information for producing red (R), green (G) and blue (B) pixels, as well as information for horizontal and vertical video scan synchronization. Also becoming commonplace are color graphics plotters, which allow the user of a workstation to produce a printed copy in full color of information stored in an electronic file or displayed on the workstation screen. One such plotter is the Schlumberger Graphics model 5232 (now Océ Graphics model G5232) color thermal plotter, which is capable of producing a "B" sized p-lot in about three minutes, when the information to be plotted is downloaded to a graphics processor associated with the plotter and appropriate plot parameters are set. Setting the plot parameters normally involves setting switches located on the front panel of the plotter to indicate (1) whether the plot is to be in line mode, such as for engineering line drawings, or in full color mode, such as for photo-like images requiring color rendering, (2) whether the background of the plot is to be reversed from that which appears on the screen, such as when colored images appearing on a black screen background are to be printed on a white background, and (3) whether the plot is to be situated on the page in portrait or landscape orientation. An additional parameter which may be set is plot size (plot scale factor).

For reasons of cost and space-saving, it is also becoming common for multiple users to share a single plotter. To do so in a practical manner, it is necessary for multiple workstations to be connected to the plotter, and for the users to have a means of sending information to be plotted to the plotter from their workstation seats.

FIG. 1 shows a common way in which such connections have heretofore been mad. Workstations 100, 102, 104 and 106 are connected to respective screens 110, 112, 114 and 116 for display of information at the respective user's work areas. Each of the workstations is also connected to a video multiplexer 118, which passes information to be plotted to a video processor 120, which in turn prepares the information for plotting by a connected plotter 122. Plotter 122 includes a front panel 124 having switches for setting certain of the plot parameters mentioned above. Other of the plot parameters may be set from switches (not illustrated) located on a front panel of the video processor 120. In addition, a respective one of remote control switches 130, 132, 134 and 136 is situated adjacent each workstation and connected to the video multiplexer by, for example, a twisted pair of wires. Actuation of a remote switch by a user instructs multiplexer 118 to "acquire" the display on the user's screen, and to pass it to the video processor for plotting by plotter 122.

Each workstation is connected to its respective screen by a group of as many as five coaxial cables, one each for R, G and B information, and up to two for video synchronization information. Depending on the type of workstation, the video synchronization information may either be (1) provided as separate horizontal and vertical synchronization signals on separate cables (five coax system), or (2) provided as a composite horizontal and vertical synchronization signal on a single cable (four coax system), or (3) provided during blanking intervals of the G information on the "green" video signal cable (three coax system).

Connection of a workstation to the video multiplexer for capture of a screen display, as shown in FIG. 1, typically involves tapping into each of the coaxial cables connecting the workstation to the screen, and running a coaxial cable from the workstation to the video multiplexer for each of the R, G and B signals and for possible synchronization signals. In addition, a video loop through-connector (126, 128) may be required if means is not provided on the workstation's screen for switching off a signal termination device in the screen's circuitry. Thus, depending on the video synchronization format of the workstation, connecting a workstation to the video multiplexer for screen display capture has heretofore required that a twisted pair of RS232 cable for the remote pushbutton switch, and from three to five coaxial cables, be run from the workstation to the multiplexer. Additional dedicated cables (not shown in FIG. 1) would have to be run from the workstation's parallel or serial data output ports to the plotter, via a dedicated processor (not necessarily the video processor 120), for transferring from the workstation to the plotter any digital files which are to be plotted without being displayed. Communication networks linking parallel ports can be costly and are generally dependent on the type of host workstations and micro-computers.

For just one or two users working in close proximity to one another and to the plotter, the conventional solution shown in FIG. 1 might be acceptable. But for a larger number of users to share a plotter, the number and bulk of cables becomes unacceptable for a number of reasons. The cost of so much cabling is high, the bulk of the cabling makes it difficult to route, and the large number of cables can be unsightly and even unsafe if not secured to avoid trip hazards.

The arrangement of FIG. 1 has yet another important disadvantage, particularly when the plotter is located at some distance from one or more of the workstations. Before a remote switch is actuated to initiate a plot of the user's screen display, the user must know (1) whether the front panel switches are set for the desired plot parameters, such as line mode, background reversal, and portrait/landscape, and (2) whether the plotter is ready to acquire a screenful of data. Since a single, high-resolution screen display may contain 2 megabytes or more of pixel data, the video processor must have a buffering capability of at least that much data to accommodate a single frame of screen data. To provide sufficient frame buffering memory for more than one or two plots in the video processor, along with the necessary print spooling logic, can make these devices substantially more costly. Even with print spooling capability, the user must verify whether the multiplexer and video processor are ready to acquire a plot, before instructing them to do so. To abort a plot in process, the user must go to the plotter and actuate an abort switch, if one is provided.

The inconvenience and lost user time with such an arrangement is evident, particularly when users may be situated in different work areas within a room or even in different rooms from the plotter. After setting up the screen display to be plotted, the user may need to walk over to the plotter to verify its correct settings, leave a note for others not to change the settings before he has made his plot, go back to his workstation to instruct the multiplexer to acquire the plot, and then return to the plotter area to retrieve his plot and his note.

SUMMARY OF THE INVENTION

It is an object of an embodiment of the present invention to provide efficient and cost-effective methods and apparatus for network connection of multiple workstations and micro-computers to a single plotter, such as a color thermal plotter, in a manner which is compatible with a wide variety of workstations and display screens available on the market.

It is a further object of an embodiment of this invention to provide such methods and apparatus which permit acquisition of an image to be plotted either by capturing a video screen display from video cables to the screen or by receiving a digital file from the host micro-computer or workstation via the host's serial or parallel data output ports, using a single medium to transmit the information to the plotter.

Still another object of an embodiment of the invention is to provide methods and apparatus which provides a full or partial menu of plotting parameters at each workstation.

Yet another object of an embodiment of the invention is to provide methods and apparatus which permit any workstation to send data to the plotter for plotting regardless of whether the other workstations connected to the plotter are powered up for operation.

These and other objects are achieved with the methods and apparatus of embodiments of the present invention. In accordance with the invention, a video chain network unit (VCU) is connected to each of the workstations for receiving analog video and/or digital serial and/or digital parallel information, and the VCUs are interconnected in series with a video processing unit (VPU) which is in turn connected to the plotter. Each VCU is provide with a set of switches for setting the plot parameters, for acquiring a plot, for repeating a plot, and for aborting a plot in process, as well as an indicator to shown when the plotter is ready to acquire a plot. The user need only go to the plotter to retrieve his plot, at a time convenient to him.

In a preferred embodiment, the invention comprises a method of transmitting signals representing an image to be plotted from one of a plurality of user locations to a plotter location, by (a) receiving at the one user location a video signal representing the image to be plotted; (b) transmitting from the one user location to the plotter location in response to a user command an identification signal identifying the one user location and indicating that the video signal is ready for transmission; (c) transmitting from the plotter location to the one user location a command signal commanding transmission of the video signal; and (d transmitting the video signal from the one user location to the plotter location in response to the command signal.

The command signal is preferably an echo of the identification signal, and may include a signal indicative of a sequence in which one or more components of the video signal are to be transmitted. The method may further include transmitting from the one user location to the plotter location a signal representing plot parameters and/or a signal representing a number of copies of the image to be plotted. The video signal is preferably converted at the plotter location to a bit map of the image to be plotted.

A preferred embodiment of the invention further provides apparatus for connecting at least one video signal source to a plotter, comprising: (a) a video chain unit associated with each source; (b) a video processor unit associated with the plotter; and (c) bus means for conveying information between the video controller unit and the video processor unit.

The video chain unit preferably comprises means for: (a) detecting a user command to transmit video information to be plotted; (b) transmitting to the video processor unit via the bus a ready signal indicating that the video chain unit is ready to transmit video information; (c) detecting a send command from the video processor to transmit video information; and (d) transmitting video information via the bus means to the video processor unit in response to the send command.

The video processor unit preferably comprises means for: (a) detecting a ready signal on the bus means indicating that one of the video processor units is ready to transmit video information; (b) transmitting a send command via the bus means indicating that the video processor unit is ready to receive video information; and (c) receiving video information on the bus means, and converting the received video information into a form recognizable by the plotter.

These and other features and forms of the invention will be apparent to those of skill in the art from the following description which is given with reference to the drawings.

BRIEF DESCRIPTION OF THE DRAWING

Preferred embodiments of the invention will now be described with reference to the accompanying drawing, in which.

DETAILED DESCRIPTION OF THE PREFERRED EMBODIMENTS

Figure 2:
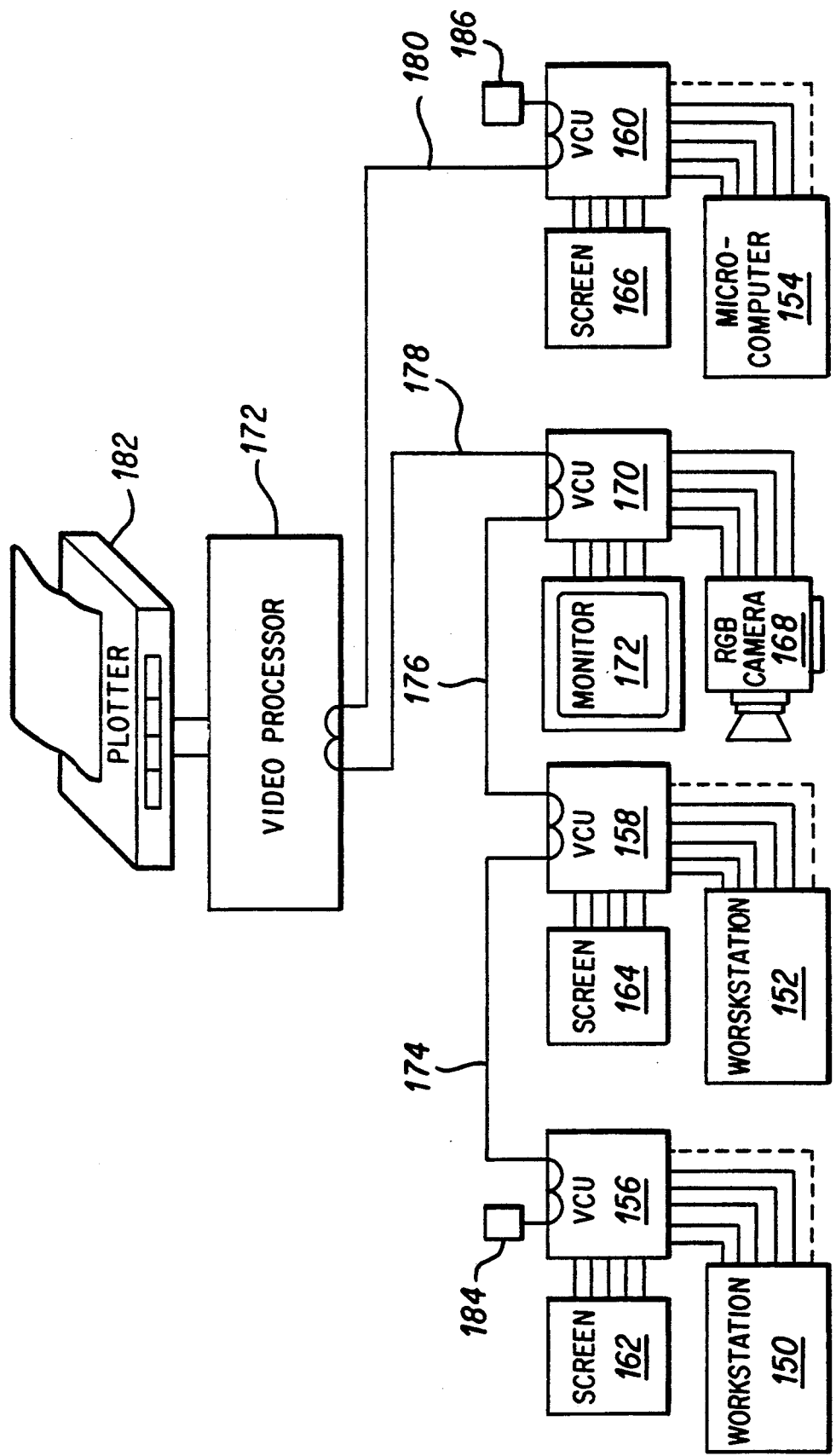
FIG. 2 shows a block diagram of a preferred network in accordance with the invention for interconnecting multiple host workstations and an RGB video camera to share a single plotter.

FIG. 2 shows in schematic block form a graphics chain network in accordance with the invention. Workstations 150 and 152 and micro-computer 154 are connected to respective video chain units (VCUs) 156, 158 and 160 by three to five coaxial cables (solid lines) and, optionally, by parallel and/or serial interface cables (-dashed lines). Color video display screens, or monitors, 162, 164 and 166 are also respectively connected to VCUs 156, 158 and 160 by three to five coaxial cables. As mentioned above, the exact number of coaxial cables depends on whether the horizontal and vertical video synchronization employed by the workstation and screen are separate, composite or carried during a blanking interval of the green (G) signal. Three of such coaxial cables carry, respectively, R, G and B analog signals, and the other two, if required, carry video sync signals. An RGB video camera 168 is likewise connected by coaxial cables to a VCU 170, as is a color video monitor 172.

Figure 1:
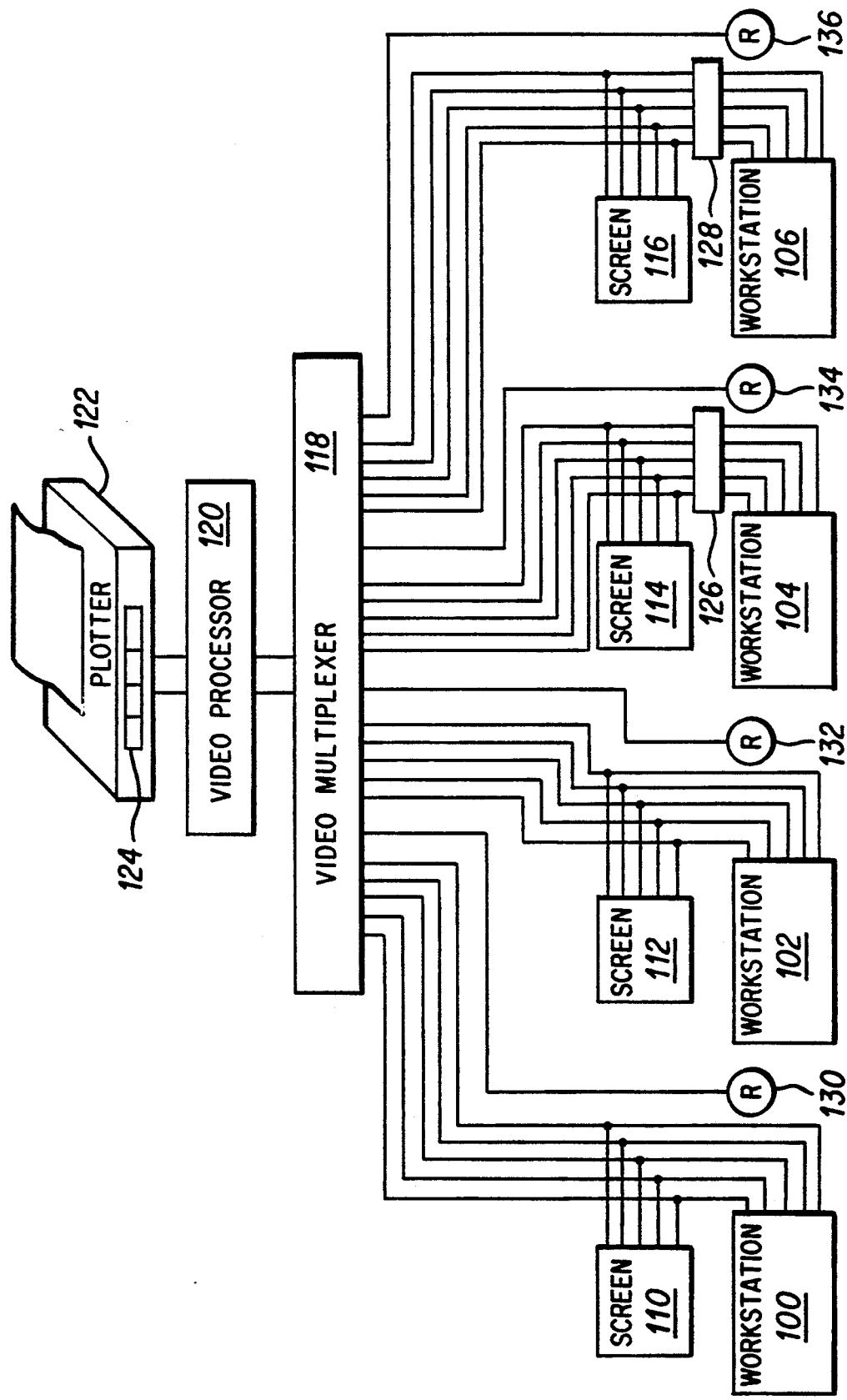
FIG. 1 shows a prior art arrangement for confection of multiple workstations to a single plotter.

The VCUs are connected in series with a video acquisition processing unit (VPU) 172 by single coaxial cables 174, 176, 178 and 180. A color plotter 182, such as a Schlumberger Graphics type 5232 color thermal plotter, is connected to video processor 172. Termination devices 184 and 186, for example 75 Ω resistors, are connected to the unused connection terminals at the end-station VCUs 156 and 160. The VCUs and the VPU may be connected in any desired sequence; that is, the VPU may be at either end of the series chain or at any location in between. The use of signal, coaxial cables to interconnect the VCUs and the VPU, and their series interconnection, substantially reduces cabling requirements as compared with the arrangement shown in FIG. 1 and allows greater flexibility in situating the workstations, micro-computer, camera and plotter in a given office environment. Each of the VCUs is preferably contained in a small box placed near the user, such as adjacent the workstation keyboard or near the video camera or monitor.

Figure 3A:
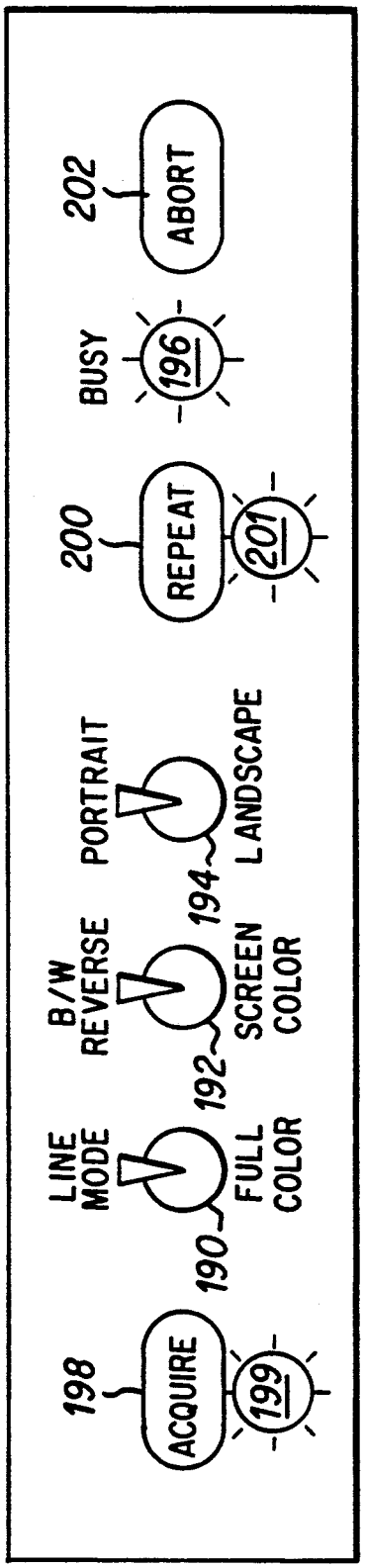
FIGS. 3A and 3B show the front and back panels, respectively, of a preferred form of video chain unit (VCU) in accordance with the invention.

FIG. 3A shows the front panel of a VCU. Respective toggle switches 190, 192 and 194 are provided for selection of the desired plot parameters: switch 190 for line mode or full color, switch 192 for selection of screen-color background or background color reversal, and switch 194 for portrait or landscape plot orientation. An indicator lamp 196 lights when the VPU is busy acquiring data from a VCU and extinguishes when the VPU is ready to acquire information to be sent to the plotter. A pushbutton switch 198 may be actuated by the user to send an instruction to acquire a plot from the user's screen. During acquisition an indicator lamp 199 is illuminated. A pushbutton switch 200 may be actuated to plot additional copies of a plot acquired by the VPU and still in the plotter's print buffer memory, illuminating an indicator 201. A pushbutton switch 202 may be actuated by the user to abort a plot which is being acquired or plotted. Additional pushbutton switches may be added as desired to control other plot parameters, such as plot size (plot scale factor and aspect ratio).

Figure 3B:
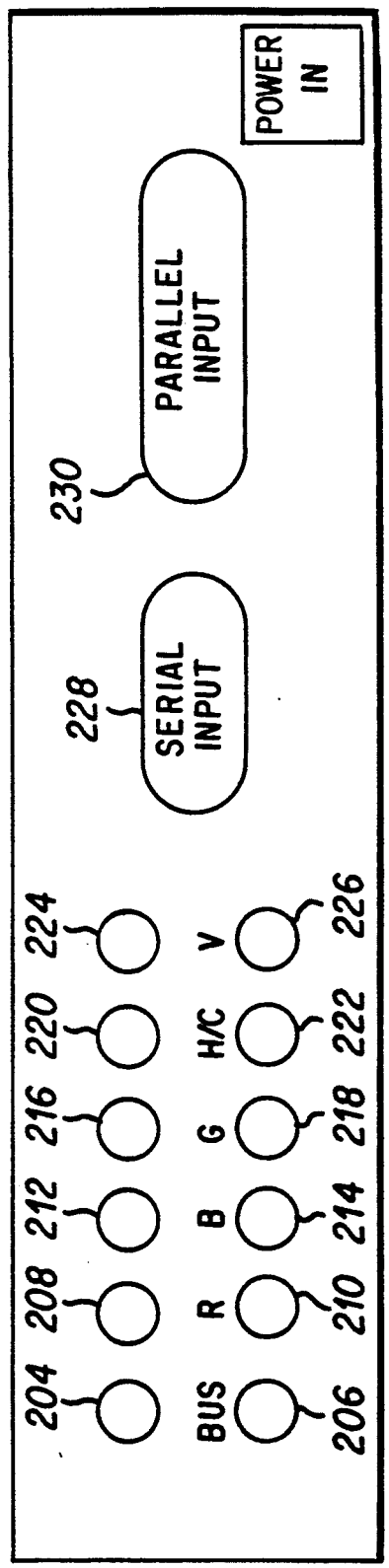

FIG. 3B shows the rear panel of a VCU. Two each of connectors 204–226, such as conventional BNC or miniature BNC connectors, are provided for connection to communication bus (described below), R, G, B, H/C sync (horizontal or composite video sync), and V sync (vertical video sync) cables. A serial digital data input connector 228 and a parallel digital data input connector 230 are also provided. The type of parallel data input connector 230 will depend upon the type of parallel interface used, such as SCSI, HPIB, Centronics, or the like.

PREFERRED EMBODIMENTS OF THE VIDEO CHAIN UNIT

Figure 4:
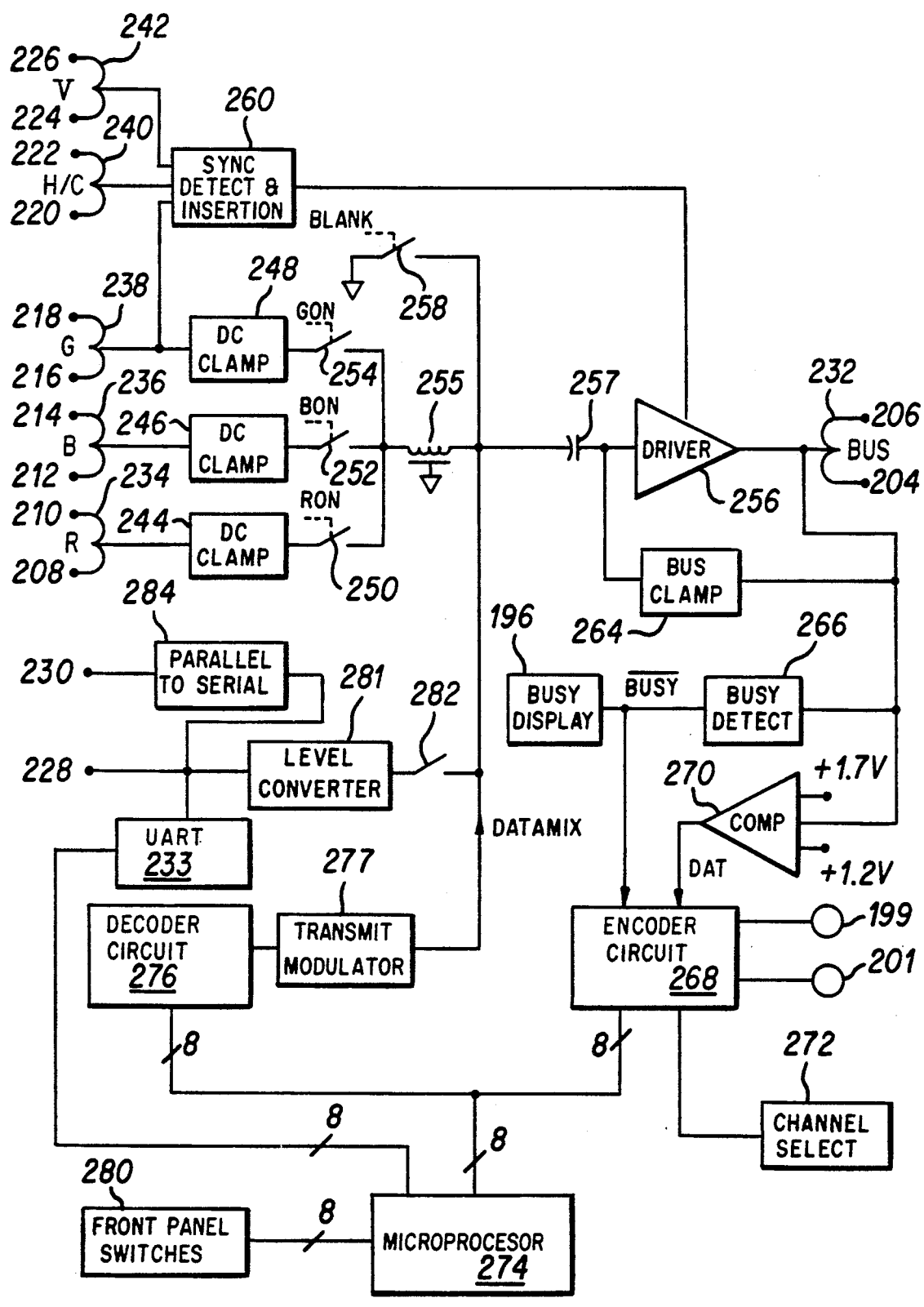
FIG. 4 shows a schematic block diagram of a preferred form of VCU in accordance with the invention.

A schematic block diagram of a preferred VCU embodiment is shown in FIG. 4, all of the VCUs being preferably of identical construction. Connectors 204 and 206 are connected to a 75-Ω through-loop 232 in the VCU such that, when VCUs are connected in series with a VPU as shown in FIG. 2, connecting cables 174–180 and a through-loop in VPU 172 form an interrupted communication bus. A major advantage of such a bus is that any of the VCUs in the chain may communicate with the VPU even when any or all of the other VCUs are switched off. A center tap in loop 232 provides communication with the internal circuitry of the VCU, so that either of connectors 204 and 206 may be considered an input or an output connector.

Connectors 208 and 210 provide connection to the respective ends of an R-signal through-loop 234, connectors 212 and 214 provide connection to the respective ends of a B-signal through-loop 236, connectors 216 and 218 provide connection to the respective ends of a G-signal through-loop 238, connectors 220 and 222 provide connection to the respective ends of an H/C-signal through-loop 240, and connectors 224 and 226 provide confection to the respective ends of a V-signal through-loop 242. Each of loops 234–242 is preferably a 75-Ω loop having a center tap coupled to internal circuitry of the VCU.

The center taps of loops 224–238 are connected to the inputs of respective DC clamp circuits 244, 246 and 248, the outputs of which are connected via respective controlled switches 250, 252 and 254 through a delay line 255 and a capacitor 257 to the input of a driver 256. A further controlled switch 258 connects the input of driver 256 to ground when closed, for video signal blanking during the blanking (sync and clamping) interval. Switches 250–254 and 258 are controlled by respective signals BON, RON, GON and BLANK from the communications circuitry of FIG. 8, and are preferably FET transistors, such as Siliconix SD5000 quad switches, though other suitable devices may be used.

The output of driver 256 is connected to the center tap of loop 232.

Figure 7:
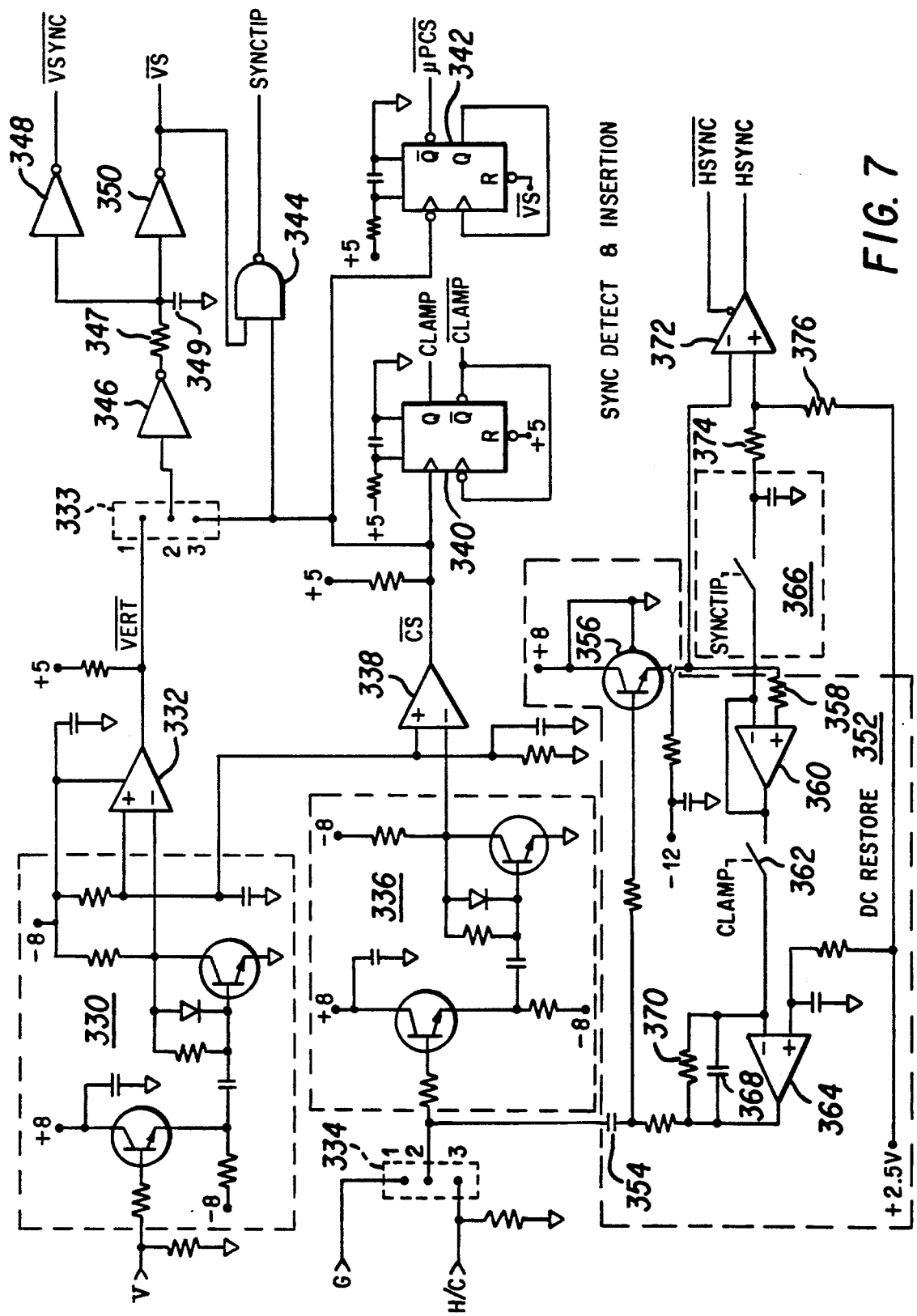
FIG. 7 shows a preferred sync detect and sync insertion circuit for the VCU of FIG. 4.

The center taps of loops 238, 240 and 242 are connected to respective inputs of sync detect and insertion circuit 260, which produces sync signals as described with reference to FIG. 7. Sync detect and insertion circuit 260 supplies sync insertion signals to the video driver 256, the output of which is connected to the center tap of loop 232.

A bus clamp (or "busy send") circuit 264 is connected to raise the DC voltage level provided to the center tap of loop 232 (and hence the voltage on the communication bus) to, for example, +1.0 volt when the VCU is sending video information to the VPU. This raised DC voltage level indicates to the other VCUs in the chain that the VPU is acquiring data, hence that the communications bus is "busy". A busy detect circuit 266 detect the DC voltage level at the center tap of loop 232 to determine whether the communications bus is in use, and provides an appropriate output signal BUSY* to busy display 196 and to a microprocessor 274. (For purposes of the present disclosure, active-low signals are identified with an asterix, e.g. BUSY* is an active-low signal).

A threshold comparator 270 compares the voltage at the center tap of loop 232 with fixed reference voltages of, for example, '1.2 volts and +1.7 volts, and provides a recovered difference signal DAT (carrying incoming data received from the VPU via the communication bus) to shift register and encoder circuit 268. As described in more detail below, signal DAT is at a logic "one" level when the voltage at the center tap of loop 232 is >+1.7 volts, at a logic "zero" "one-half" level (for clock signal recovery) when the voltage at the center tap of loop 232 is between +1.2 and +1.7 volts, i.e. at +1.0 volt.

A channel select switch 272 is also connected to shift register and encoder circuit 268 for establishing a VCU address. Upon installation of the VCUs as shown in FIG. 2, the channel select switch 272 of each VCU is set to give it a unique address, so that VPU 172 may individually communicate with each VCU. The addressing and communication protocol is described in more detail below.

The VCU is controlled by a free-running microprocessor circuit 274, described below with reference to FIG. 8. Data is input to microprocessor circuit 274 from an encoder circuit 268, and data is output from microprocessor circuit 274 via a decoder circuit 276. Data output from decoder circuit 276 is passed to the input of driver 256 via a data modulator 277 as described below with reference to FIG. 11. Front panel switches 280 (comprising switches 190-194 and 198-202 of FIG. 3A) are connected to input ports of microprocessor circuit 274.

The VCU may optionally be provided with means for transmitting image data files received in serial or parallel form from the associated workstation, without the need to first display the image on the workstation screen. FIG. 4 shows an example of such an implementation. Serial data received at input connector 228 is level-adjusted in a level converter 281 and then passed via controlled switch 282, driver 256 and loop 232 to the communications bus. The digital confection between the workstation and the VCU may be a serial RS422/423 interface (usable as an RS232 interface) which acts primarily to pass data from the workstation to the VCU but which also transmits back to the workstation a start/stop control command. A conventional universal asynchronous receiver-transmitter (UART) 283 is connected to the workstation via input connector 228 and to microprocessor 274 via an 8-bit data bus. Serial command lines such as Clear-to-Send and Data-Terminal-Ready are preferably set to allow continual transmission of data from the workstation to the VCU. If the workstation requires a parallel interface rather than a serial interface for confection to the VCU, a conventional parallel-to-serial protocol converter 284 (such as model 8150 or 8150-1, available from INMAC, P.O. Box 58031, Santa Clara, CA 95052, or model GHPIC 85B available from Black Box, P.O. Box 12800, Pittsburgh, PA 15241) may be provided in the serial data line.

Figure 5:
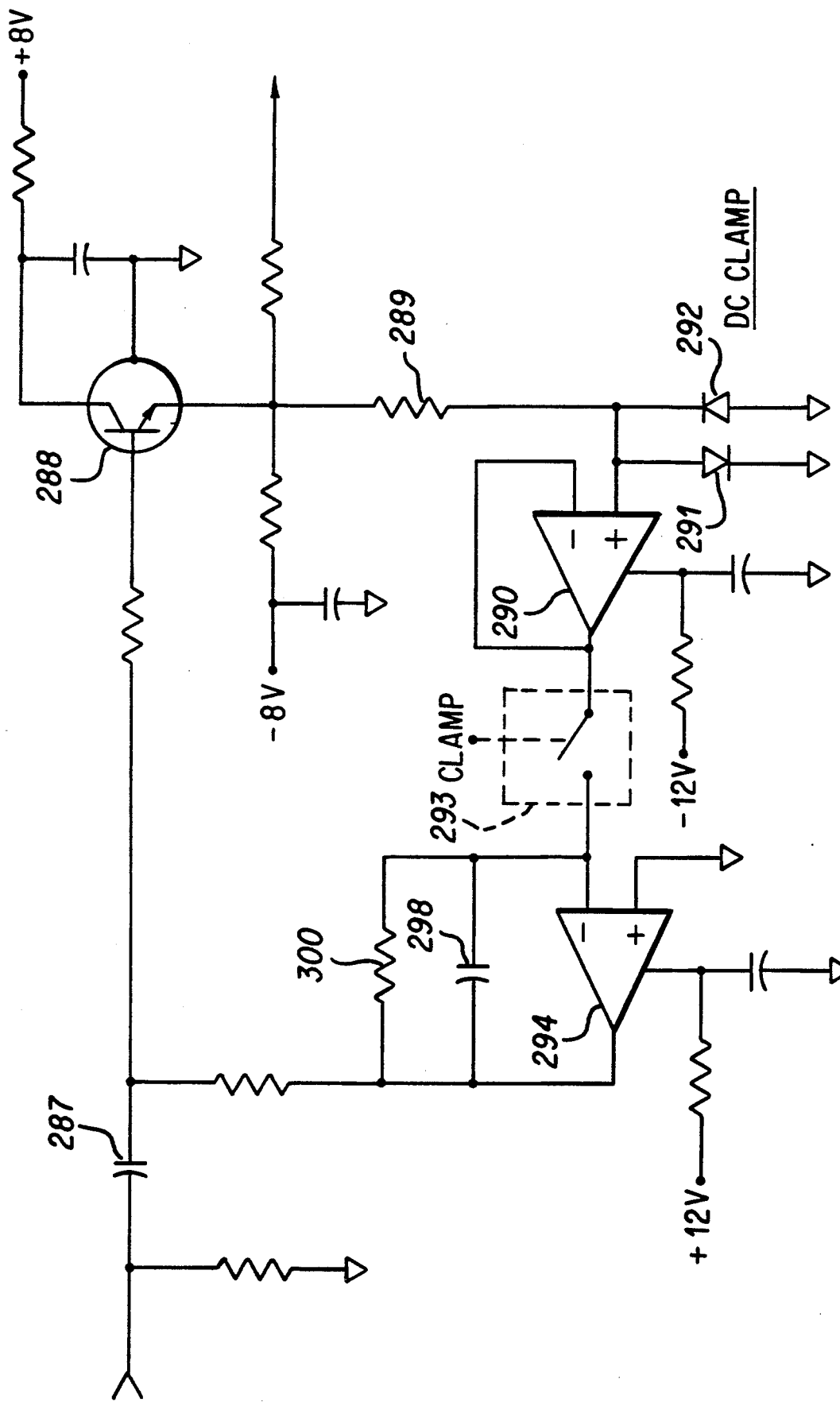
FIG. 5 shows a preferred DC restore circuit for the VCU of FIG. 4.

DC clamp circuits 244-248 may be of any suitable type known in the art, but are preferably as shown in FIG. 5. The incoming video signal is AC coupled via a capacitor 287 to the base of a transistor 288, the emitter of which provides the output of the circuit. The emitter of transistor 288 is also coupled through a resistor 289 to the input of a unity-gain buffer amplifier 290, and through a pair of diodes 291 and 292 to ground. Diodes 290 and 291 are connected in opposite polarity to one another, such that the voltage applied to the input of the buffer amplifier 290 will not exceed the forward bias voltage of either diode, e.g., ±0.7 volt. The output of buffer amplifier 290 is connected through a controlled switch 293 to the negative input of a differential amplifier 294. The positive input of differential amplifier 294 is connected to zero voltage, which is the clamping voltage. Switch 293 is closed when signal CLAMP is at a logic high level, which occurs for a brief period, on the order of 1-2 μseconds, during the horizontal "back porch" immediately following each horizontal sync pulse. During the period when switch 293 is closed, voltage at the output of buffer amplifier 290 is applied to a feedback capacitor 298. The time constant of capacitor 298 and parallel-connected resistor 300 is selected to maintain the DC bias level applied to the base of transistor 288 at a level which maintains a zero volt DC output at the emitter of transistor 288 for the duration of one horizontal line.

Figure 6:
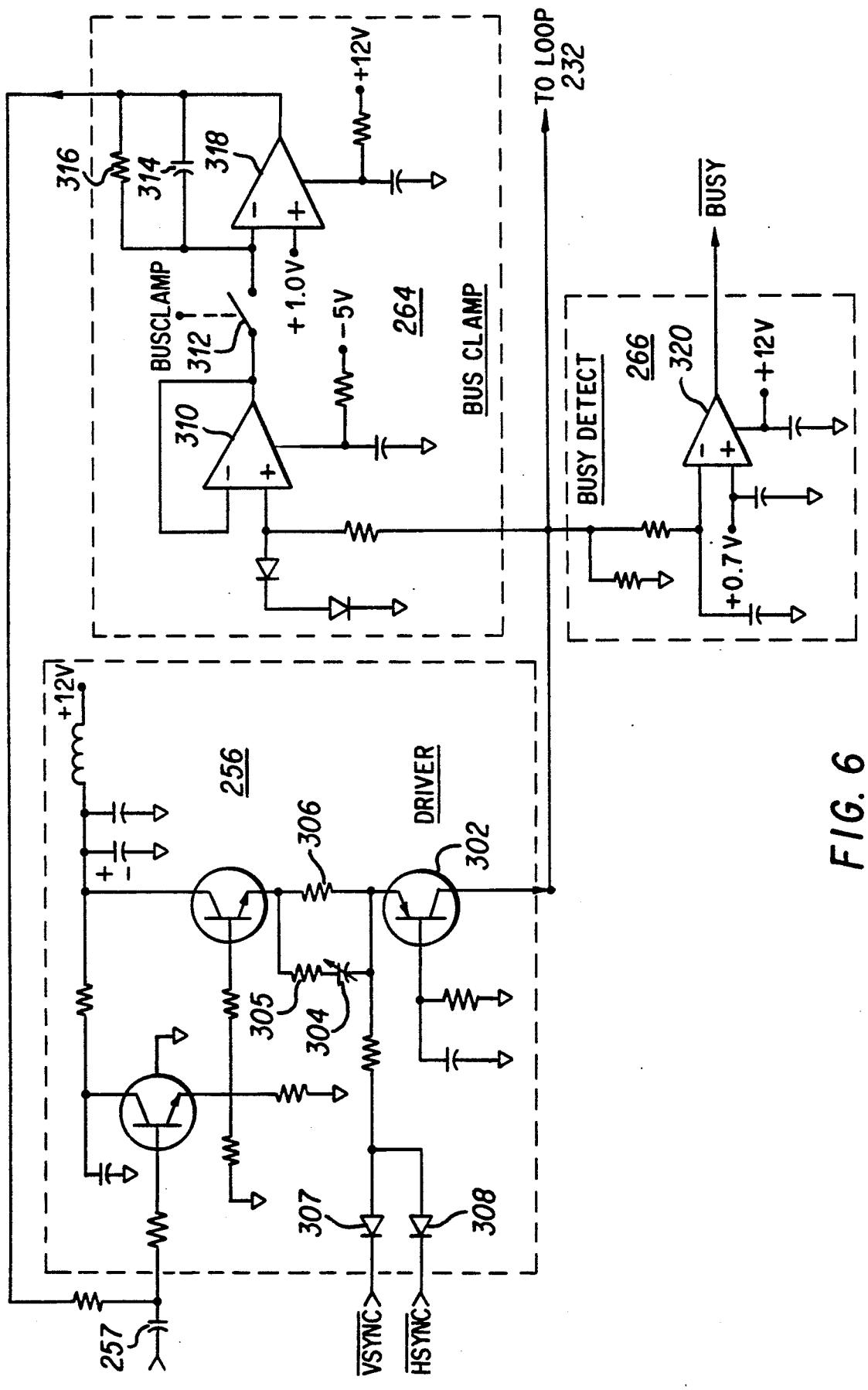
FIG. 6 shows preferred RGB driver, bus clamp and busy detect circuits for the VCU of FIG. 4.

FIG. 6 shows additional circuit details of the VCU. Driver 256 is a three-transistor circuit having its gain set such that the overall gain of the VCU is unity when driving a video signal to the communications bus, which may be a 75-Ω coaxial cable. A particular advantage of the illustrated driver circuit is that, because of the common-base configuration of its output transistor 302, the driver draws current only when a signal is present at its input. The high-frequency response of driver 256 is preferably matched to the length of the cable from the VCU to the VPU upon installation of the VCU in a network, by appropriate selection of capacitor 304. Series-connected capacitor 304 and resistor 305 are connected in parallel with gain resistor 306 of the driver. Hot carrier (Schottky) diodes 307 and 308 serve as sync enable for the signals VSYNC* and HSYNC* (from the sync detect and insertion circuit of FIG. 7), modulating the current at the emitter of transistor 302 such that, during each sync pulse period, the voltage applied to the center tap of loop 232 will drop from, for example +1.0 volt to +0.5 volt to provide a sync pulse.

Bus clamp ("busy send") circuit 264 includes a unity gain buffer amplifier 310, the output of which is coupled through a controlled switch 312 to the negative input of a differential amplifier 318 having parallel-connected feedback resistor 316 and capacitor 314. The positive input of amplifier 318 is connected to a +1.0 volt source. In operation, switch 312 is closed for a brief time during each horizontal line in response to a signal BUSCLAMP produced when the VCU is transmitting. (The origin of the signal BUSCLAMP is descried below with reference to FIG. 8). Voltage appearing at the output of amplifier 310 when switch 312 is closed will charge capacitor 314. Thus, when the VCU is transmitting information to the VPU, switch 312 is closed once during each H line so that the DC level at the center tap of loop 232 is maintained at +1.0 volt to signal to the remaining VCUs that the communications bus is "busy".

Each VCU is also provided with a busy detect circuit 266, as shown in FIG. 6. The busy detect circuit comprises a comparator 320 connected to compare the voltage level at the center tap of loop 232 with a +0.7 volt reference. When the communications bus is busy (i.e., its DC level is +1.0 volt), the BUSY* output signal is comparator 266 is at a logic low level. When the communications bus is not busy (i.e., its DC level is at zero volts), the BUSY* output signal of comparator 266 is at a logic high level. The active-low BUSY* output signal drives busy indicator 196 and is supplied to microprocessor 274 via encoder circuit 268 (see FIG. 4).

The video sync detect and insertion circuit 260 will now be described with reference to FIG. 7. Sync detect and insertion circuit 260 receives at its inputs the green video signal G from the center tap of loop 238, the horizontal or composite video sync signal H/C from the center tap of loop 240, and the vertical video sync signal V from the center tap of loop 242. Video sync signal V is detected in a conventional sync separator circuit 330 and supplied to the negative input of a comparator 332. Comparator 332 supplies an active-low vertical sync signal VERT* to pin 1 of a jumper switch 33.

The green video signal G is supplied to pin 1 and the composite sync signal H/C is supplied to pin 3 of a jumper switch 334. Pin 2 of jumper switch 334 is connected to the input of a conventional sync separator circuit 336, the output of which is connected to the negative input of a comparator 338. Comparator 338 has its positive input connected to a voltage reference source, and provides at its output a composite sync signal CS* (line 3 of FIG. 12) to pin 3 of jumper switch 333, to the clock input of a one-shot multivibrator 340, to the active-low clock input of a one-shot multivibrator 342, and to one input of a NAND gate 344. One shot multivibrator 340 has its RC time constant set such that it produces a 1 μsec-wide positive-going pulse at its Q output and a 1 μsec-wide negative-going pulse at its Q* output in response to a rising edge appearing at its clock input. One-shot multivibrator 340 provides signals CLAMP (line 4 of FIG. 12) and CLAMP* (line 3 of FIG. 13) at its respective Q and Q* outputs. One shot multivibrator 342 has its RC time constant set such that is produces a 3 μsecwide negative-going pulse at its Q* output in response to a falling edge appearing t its active-low clock input. One-shot multivibrator 342 provides signal μPCS* at its Q* output. Signal μPCS* differs from signal CS* in that the negative-going pulses are extended to allow for the relatively slow processing speed of the microprocessor of FIG. 8. One-shot multivibrator 342 is reset by signal VS* from the output of a NAND gate 350.

The signal at pin 2 of jumper switch 333 (either signal VERT* or CS*, depending on the setting of jumper switch 333) is buffered through inverters 346, 348 and 350 to provide vertical sync signals VSYNC* and VS*. The RC circuit comprising resistor 347 and capacitor 349 serves to filter out any serration or equalization pulses which may exist during the vertical blanking, as well as horizontal pulses in case of C/H sync or G sync, as explained below with reference to jumper switch 33. NAND gate 344 receives signals CS* and VS* at its respective inputs, and provides a signal SYNCTIP at its output.

A DC restore circuit 352 restores the DC level of the signal appearing at pin 2 of jumper switch 334 to 2.5 volts. The incoming signal is AC coupled via a capacitor 354 to the base of a transistor 345, the emitter of which provides the output of the circuit. The emitter of transistor 356 is also coupled through a resistor 358 to the input of a unity-gain buffer amplifier 360. The output of buffer amplifier 360 is connected through a controlled switch 362 to the negative input of a comparator 364. The positive input of comparator 364 is connected to a 2.5 volt DC reference source. Switch 362 is closed when signal CLAMP is at a logic high level, which occurs for a brief period, on the order of 1-2 μseconds, during the horizontal "back porch" immediately following each horizontal sync pulse. During each period when switch 362 is closed, voltage at the output of buffer amplifier 360 is applied to a capacitor 368 connected in parallel with a resistor 370 from the negative input to the output of amplifier 364. The time constant of capacitor 368 and resistor 370 is selected to maintain the DC bias level applied to the base of transistor 356 at a level which gives a 2.5 volt DC output at the emitter of transistor 356 for the duration of one horizontal line.

A high speed comparator 372 (such as type LT1016CN) has its positive input connected to the center of a voltage divider comprising resistors 374 and 376, such that the voltage at the positive input of comparator 370 is mid-way between the 2.5 volt DC reference and the DC level at the sync tip. The sync signal from the emitter of transistor 356 is applied to the negative input of comparator 372. If incoming sync information is contained in a conventional "sync on green" RGB signal, the "back porch" level will be +0.3 volt, the negative-going sync signals will have a sync pulse tip at zero volt, and the video information will range between +0.3 and +1.0 volt. In this case, the signal at the emitter of transistor 356 will vary from +2.5 volts to +2.2 volts, and the level at the output of sample-and-hold circuit 366 will be +2.2 volts. Since the values of resistors 374 and 376 are identical, the threshold of comparator 372 is set at +2.35 volts, causing comparator 372 to detect the midpoint of each rising or falling edge of the signal applied to its negative input.

If incoming sync information is contained in a conventional horizontal or composite signal H/C produced with transistor-transistor logic, the "back porch" level will be zero volt and the level of the negative-going horizontal sync pulse tips will be 5 volts. In this case, the signal at the emitter of transistor 356 will vary from +2.5 volts to −2.5 volts, and the level at the output of sample-and-hold circuit 366 will be −2.5 volts. Since the values of resistors 374 and 376 are identical, the threshold of comparator 372 is set at zero, causing comparator 372 to detect the midpoint of each rising or falling edge of the signal applied to its negative input. Comparator 372 provides horizontal sync signals HSYNC (line 2 of FIG. 12) and HSYNC* at its respective active-high and active-low outputs.

Jumper switches 333 and 334 are set appropriately when the VCU is installed for use. If the VCU is connected to a 3-coax system (sync on Green), terminals 2 and 3 of jumper switch 333 are connected to one another. In this case, sync separator 336 will detecting coming sync information (line 1 of FIG. 12) from green video signal G and provide the sync information to comparator 338, which produces a composite sync output signal CS* (line 3 of FIG. 12). NAND gates 346–350 then separate to the vertical sync to produce signals VSYNC* and VS* (line 2 of FIG. 13). NAND gate 344 derives from signals VS* and CS* the signal SYNCTIP, which goes high during each sync period to close the switch of sample-and-hold circuit 366. One shot multivibrator derive signals CLAMP, CLAMP* and μPCS* from signal CS*. DC restore circuit 352, sample-and-hold circuit 366 and comparator 372 separate the horizontal sync information from video signal G to produce signals HSYNC and HSYNC*. If the VCU is connected to a 4-coax system (sync as a composite signal H/C), terminals 2 and 3 of jumper switch 333 are connected together and terminals 2 and 3 of jumper switch 334 are connected together. In this case, sync separator 336 will detect sync information from composite sync signal H/C and provide the sync information to comparator 338, which produces a composite sync output signal CS*. NAND gates 346–350 then separate the vertical sync to produce signals VSYNC* and VS*. NAND gate 344 derives from signals VS* and CS* the signal SYNCTIP, which goes high during each sync period to close the switch of sample-and-hold circuit 366. One shot multivibrator derive signals CLAMP, CLAMP* and μPCS* from signal CS*. DC restore circuit 352, sample-and-hold circuit 366 and comparator 372 separate the horizontal sync information from composite sync signal H/C to produce signals HSYNC and HSYNC*.

If the VCU is connected to a 5-coax system (separate vertical sync signal VC and horizontal sync signal H/C), terminals 1 and 2 of jumper switch 333 are connected together and terminals 2 and 3 of jumper switch 334 are connected together. In this case, sync separator 330 will detect vertical sync information from vertical sync signal V and provide the sync information to comparator 332, which produces a vertical sync output signal VERT*. NAND gates 346–350 then filter out any serration or equalization pulses to produce signals VSYNC* and VS*. Sync separator 336 detect horizontal sync information from horizontal sync signal H/C and provide the sync information to comparator 336, which produces a horizontal sync output signal CS*. NAND gate 344 derives from signals VS* and CS* the signal SYNCTIP, which goes high during each sync period to close the switch of sample-and-hold circuit 366. One shot multivibrator derive signals CLAMP, CLAMP* and μPCS* from signal CS*. DC restore circuit 352, sample-and-hold circuit 366 and comparator 372 separate the horizontal sync information from horizontal sync signal H/C to produce signals HSYNC and HSYNC*.

The data communications circuit of the VCU will now be described with reference to FIGS. 8–12. As shown in FIG. 8, plot parameter switches 190–194 are connected to respective lines 6, 5 and 4 of port 1 of microprocessor 274, which may be an 8-bit device of type D8748H. Acquire, Repeat and Abort switches 198–202 are connected to respective input lines 0-2 of port 1 of microprocessor 274. Abort switch 202 is also connected to the active-low HALT input of microprocessor 274. Line 3 of port 1 of microprocessor 274 is connected to receive a signal VIDEO/SERIAL, which may originate from the workstation or may be provided by a further switch (not shown), for switching between transmission of RGB video signals and serial digital data signals. Line 7 of port 1 of microprocessor 274 is connected to ground (logic low). A suitable crystal 380, such as a 10.75 MHz crystal, is connected to the XTAL inputs of microprocessor 274. Vertical and horizontal sync timing signals VS* and μPCS* (from the circuit of FIG. 7) are supplied to respective T0 and T1 inputs of microprocessor 274.

Lines 0–6 of port 2 of microprocessor 274 supply various control signals to other circuitry of the VCU. Line 0 of port 2 supplies a signal CHANNEL ON, and lines 1–3 of port 2 supply signals REN ("red enable"), GEN ("green enable") and BEN ("blue enable"). Lines 4–6 of port 2 supply signals XMIT ("transmit"), RECV ("receive") and I/o, respectively. Data bus terminals D0–D7 of microprocessor 274 are connected to an 8-bit data bus 400 which communicates with encoder circuit 268 and decoder circuit 276.

Figure 11:
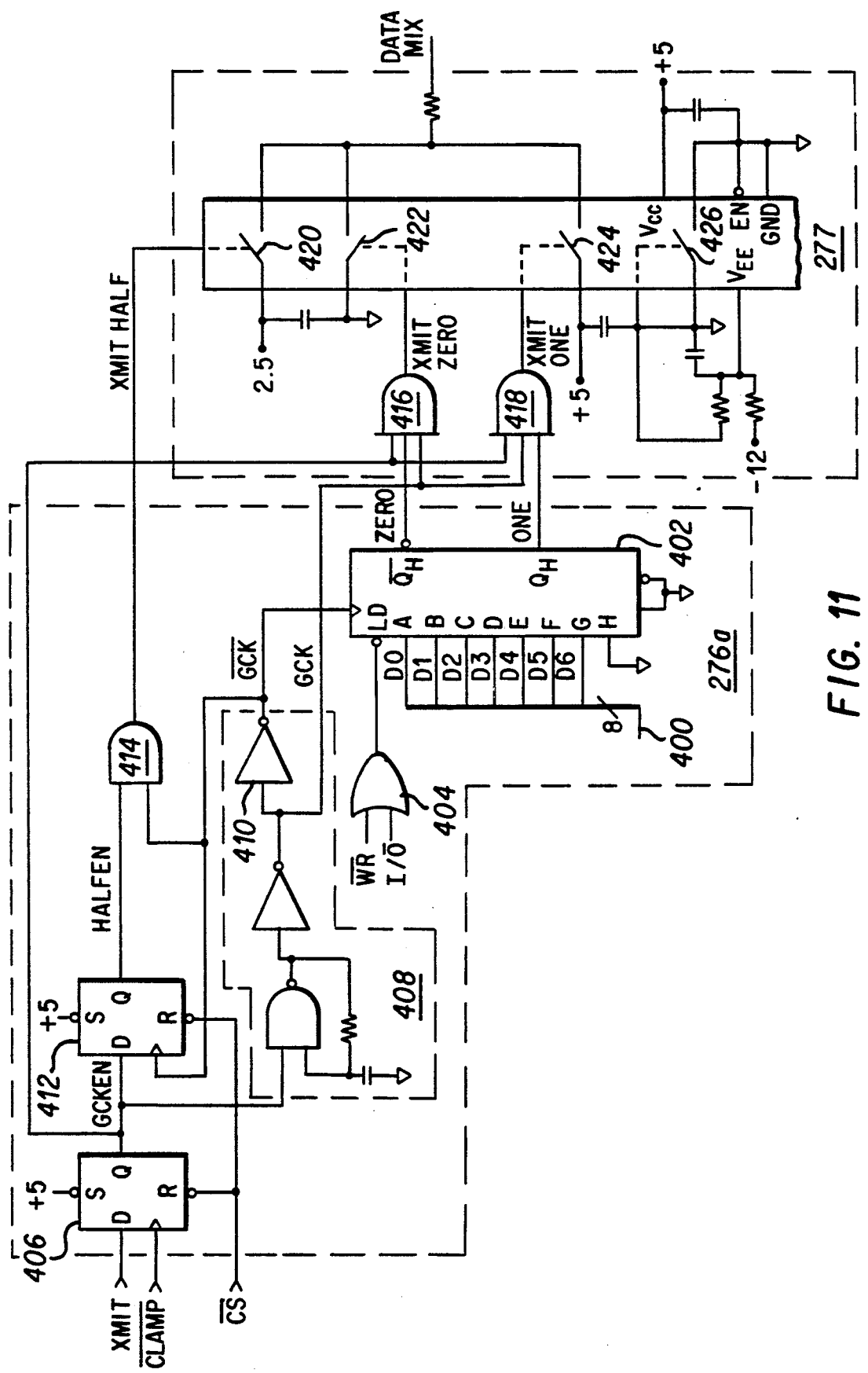

As shown in FIG. 11, portion 276a of decoder circuit 276 has a decoder 402 with write ports A–G connected to respective conductors D0–D6 of data bus 400. Write port H of decoder 402 is connected to a zero logic level, so that the most significant output bit transmitted will always be zero. Signals WR* and I/o (from microprocessor 274) are supplied to the respective inputs of an OR gate 404, the output of which is connected to the active-low write-enable input LD of decoder 402. A gated clock signal GCK* is supplied to the clock input of decoder 402, and the active-low $Q_H*$ and active-high $Q_H$ outputs of decoder 402 supply respective output signals ZERO (line 8 of FIG. 13) and ONE (line 9 of FIG. 13).

A latch 406 has its D input connected to receive signal XMIT (from microprocessor 274), its clock input connected to receive signal CLAMP* (from sync detect and insertion circuit 260), and its active-low reset input connected to receive signal CS* (from sync detect and insertion circuit 260). Latch 406 provides a gated clock enable signal GCKEN (line 4 of FIG. 13) at its Q output. Signal GCKEN is supplied to the input of a clock signal generator subcircuit, which produces a 1 MHz clock signal GCK (line 5 of FIG. 13) during the time that signal GCKEN is at a logic high level. Signal GCK is inverted by an inverter 410 and supplied to the clock inputs of decoder 402 and of a latch 412. Latch 412 receives signal GCKEN at its D input and signal CS* at its active-low reset input, producing a its output a signal HALF EN (line 6 of FIG. 13). Signals HALF EN and GCK* are supplied to the inputs of an AND gate 414, which produces at its output a signal XMIT HALF (line 7 of FIG. 13). an AND gate 416 receives signals GCKEN, GCK and ZERO at its respective inputs, producing a signal XMIT ZERO (line 10 of FIG. 13) at its output. An AND gate 418 receives signals GCKEN, GCK and ONE at its respective inputs, producing a signal XMIT ZERO (line 11 of FIG. 13) at its output.

Data modulator 277 comprises a set of switches 420, 422, 424 and 246, such as a quad switch of type HC4316. During data transmission, when signal XMIT HALF is at a logic high level, switch 420 is closed, causing signal DATAMIX to assume a voltage level which will produce a +1.5 volt level at the output of driver 256. When signal XMIT ZERO is at a logic level, switch 422 is closed, causing signal DATAMIX to assume a voltage level which will maintain the +1.0 volt level at the output of driver 256 (i.e., the level produced by bus clamp circuit 264). When signal XMIT ONE is at a logic high level, switch 424 is closed, causing signal DATAMIX to assume a voltage level which will produce a +2.0 volt level at the output of driver 256. The resulting data signal applied to the communications bus via loop 232 is accordingly in the format shown in line 12 of FIG. 13, allowing handshake information to be transmitted from the VCU to the VPU during each vertical blanking interval.

Figure 8:
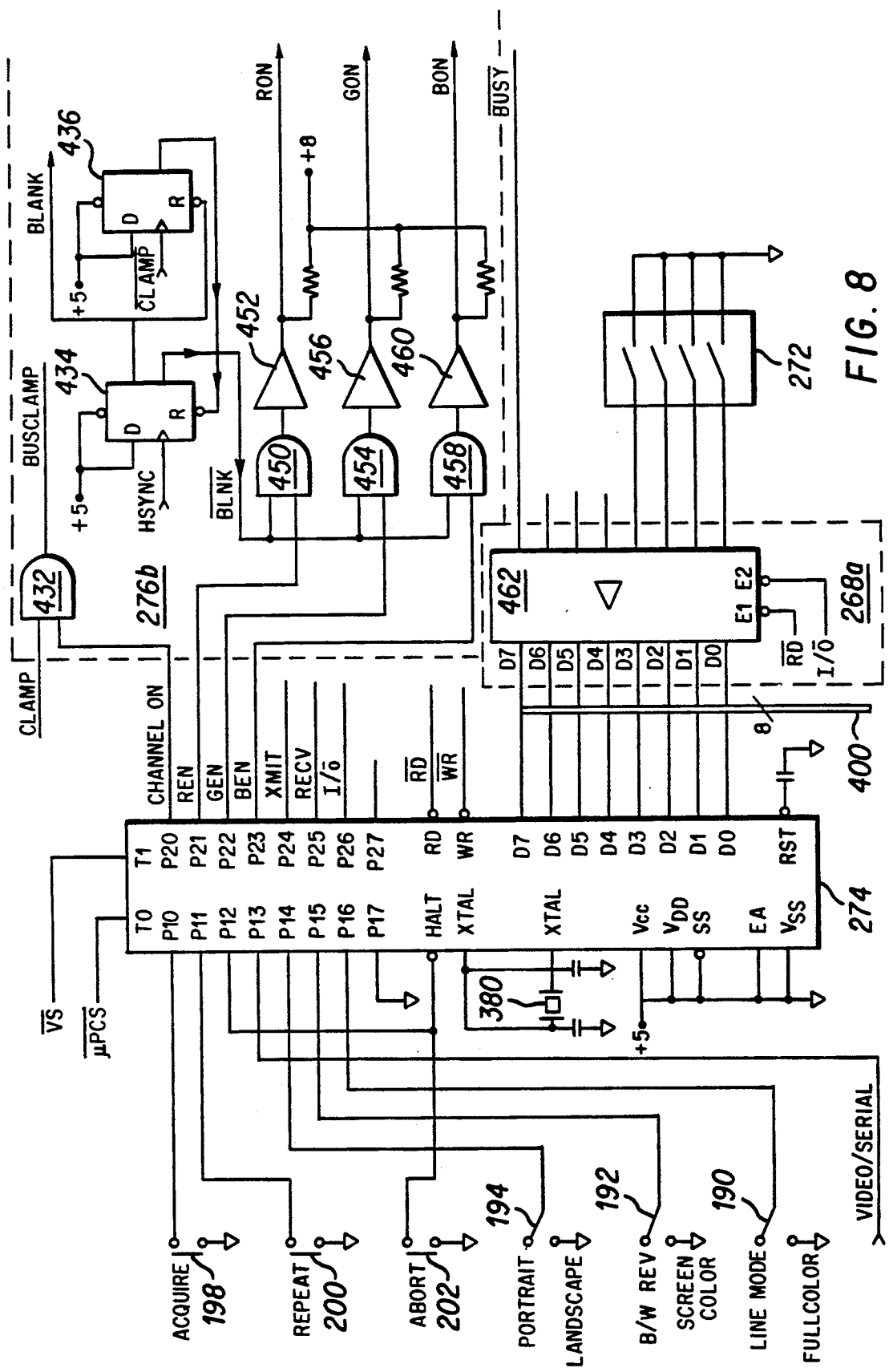
FIGS. 8–11 show preferred data communications circuitry for the VCU of FIG. 4.

Portion 276b of encoder circuit 276, shown in FIG. 8, enables reception of handshake (data +clock) information transmitted from the VPU at the VPU. An AND gate 432 receives the signal CLAMP from sync detect and insertion circuit 260 and the signal CHANNEL ON from microprocessor 274, and provides at its output a signal BUSCLAMP which activates bus clamp circuit 264 (FIG. 6) when the VCU is transmitting video information. Signal CLAMP (line 4 of FIG. 12) is a positive-going pulse of about 1 μsec duration having a leading edge which follows the trailing edge of each horizontal sync pulse of signal CS* (line 3 of FIG. 12), and signal BUSCLAMP (line 5 of FIG. 12) corresponds to signal CLAMP when the VCU is transmitting.

Figure 12:
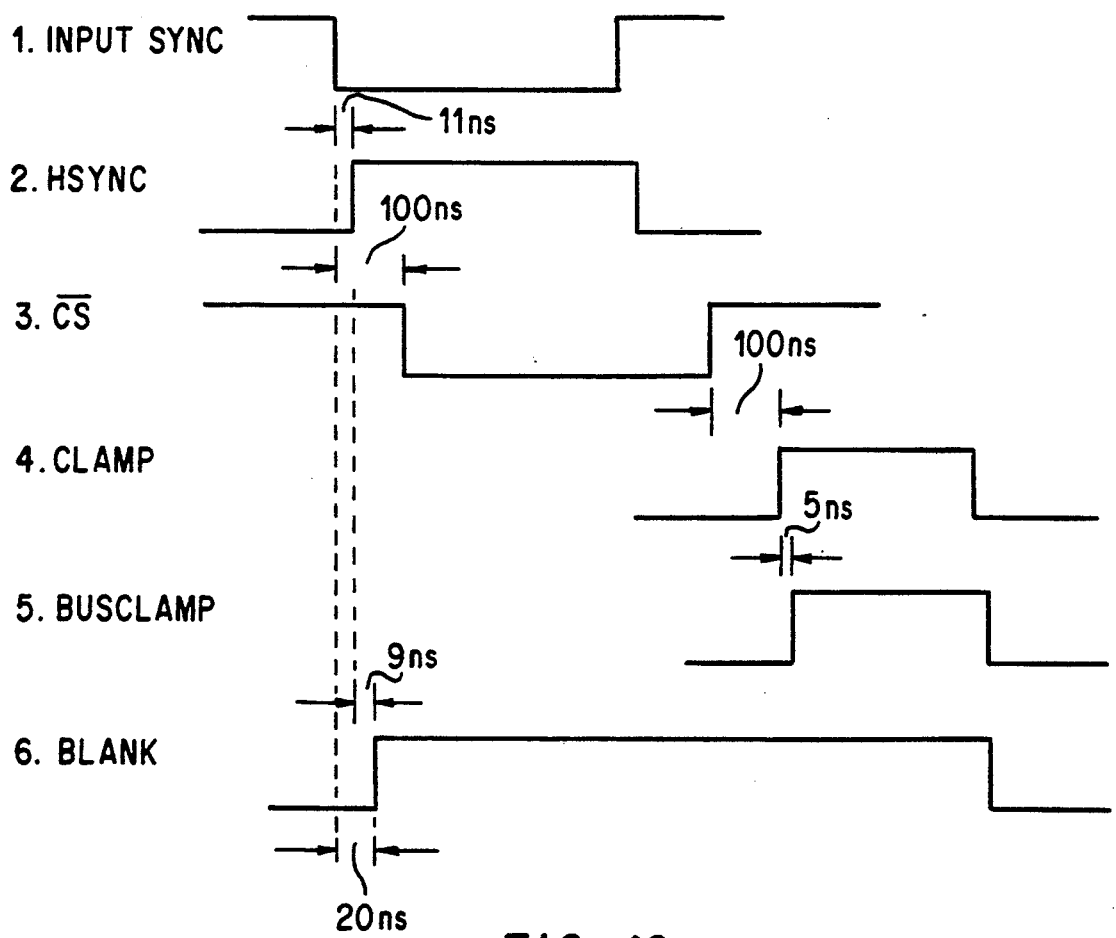
FIGS. 12–14 show waveforms and timing relationships of various signals of preferred embodiments of the VCU and VPU.
Figure 13:
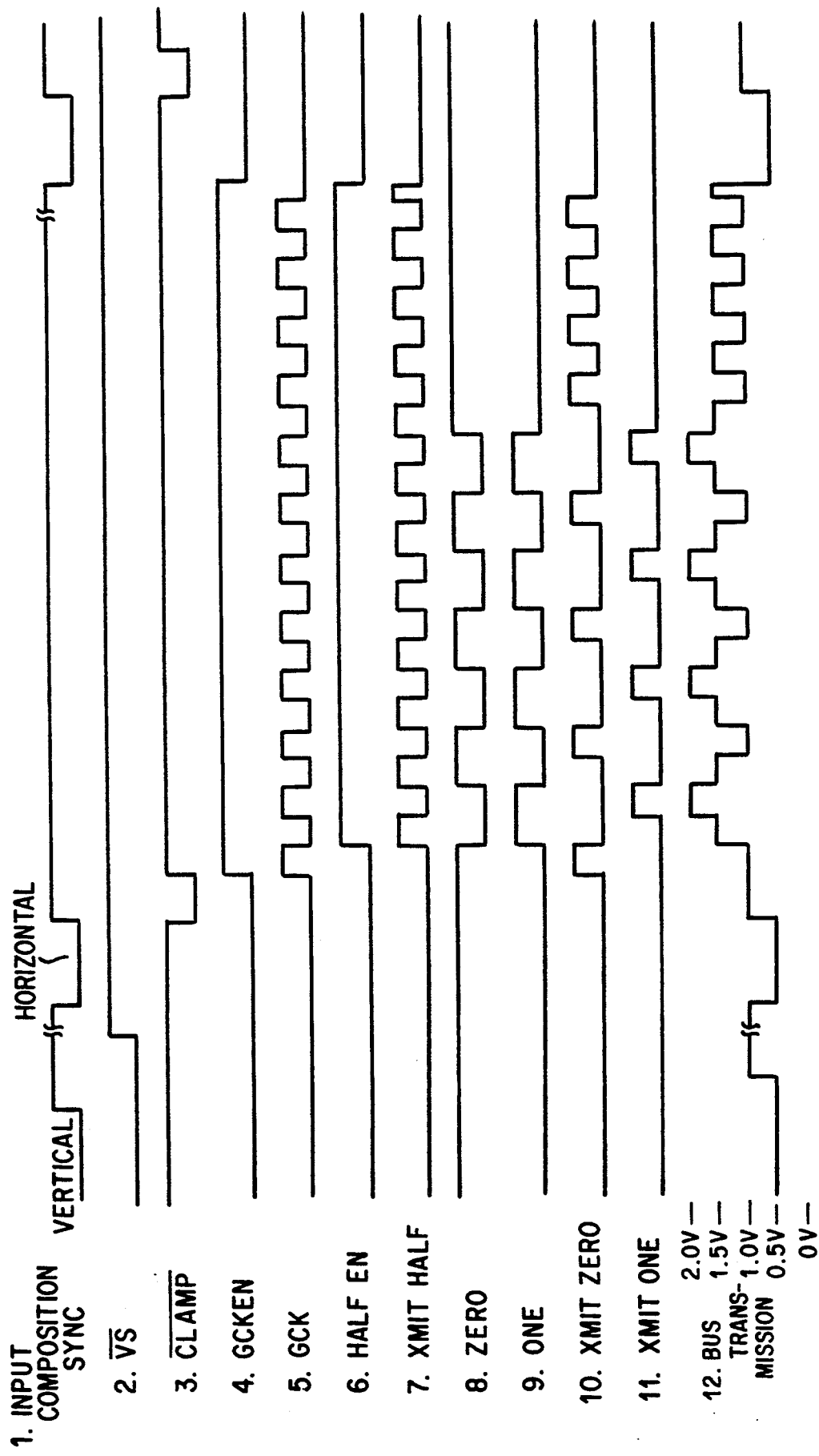

Also as shown in FIG. 8, portion 276b of encoder circuit 276 includes a pair of fast, D-type flip-flops 434 and 436, which may be of type F74. Flip-flops 434 and 436 generate a signal BLANK which has a positive-going pulse covering in time the pulse durations of signal HSYNC and CLAMP. The leading edge of signal HSYNC (line 2 of FIG. 12) triggers flip-flop 434. Signal BLANK (line 6 of FIG. 12) is produced at one output of flip-flop 434. Signal BLANK* is produced at the other output of flip-fop 434, and serves to disable AND gates 450, 454, and 458. Signal BLAND from flip-flop 434 is also supplied to the reset input of flip-flop 436. The trailing edge of the pulse of signal CLAMP* sets flip-flop 436, thus resetting flip-flop 434 and causing an end to the BLANK signal pulse. The total delay between the leading edge of an input sync pulse (line 1 of FIG. 12) and the leading edge of a BLANK signal pulse is preferably a maximum of 20 nsec as indicated in FIG. 12. It will be recalled that the purpose of the pulse of signal BLANK is to close switch 258 during the blanking interval of each horizontal line to strip sync information from the RGB signals appearing at loops 234-238.

An AND gate 450 receives signal REN at a first input and signal BLNK* at a second input, providing through a driver 452 a signal RON. Signal RON serves to close switch 250 (FIG. 4) other than during horizontal blanking intervals to allow red video information to pass to driver 256 via delay line 255 when signal REN assumes a logic high level. An AND gate 454 receives signal GEN at a first input and signal BLNK* at a second input, providing through a driver 456 a signal GON. Signal GON serves to close switch 254 (FIG. 4) other than during horizontal blanking intervals to allow green video information to pass to driver 256 via delay line 255 when signal GEN assumes a logic high level. An AND gate 458 receives signal BEN at a first input and signal BLNK* at a second input, providing through a driver 460 a signal BON. Signal BON serves to close switch 252 (FIG. 4) other than during horizontal blanking intervals to allow blue video information to pass to driver 256 via delay line 255 when signal BEN assumes a logic high level. Delay line 255 serves to delay the video signals by an amount equal to the delay between incoming sync pulses (from the workstation or RGB camera connected to the VCU) and the sync pulses inserted by sync detect and insertion circuit 260, a delay which may be on the order of 40 nanoseconds.

Encoder circuit 268 allows the VCU to recover data transmitted from the VPU. A portion 268a of encoder circuit 268 is shown in FIG. 8. Four input ports of a shift register driver 462 (such as type HC541) are connected to a bank of channel select switches 272 which are set during installation of the VCU to give it a unique address for communication with the VPU. A further input port of shift register driver 462 receives the BUSY* signal which informs the microprocessor 274 that the video communication bus is being used. Data bus ports D0-D7 of shift register driver 462 are connected to microprocessor 274 via data bus 400, and active-low control ports E1 and E2 receive signals RD* and I/$\overline{O}$ for passing the VCU address and the busy status of the communication bus to microprocessor 274 when commanded to do so.

Figure 9:
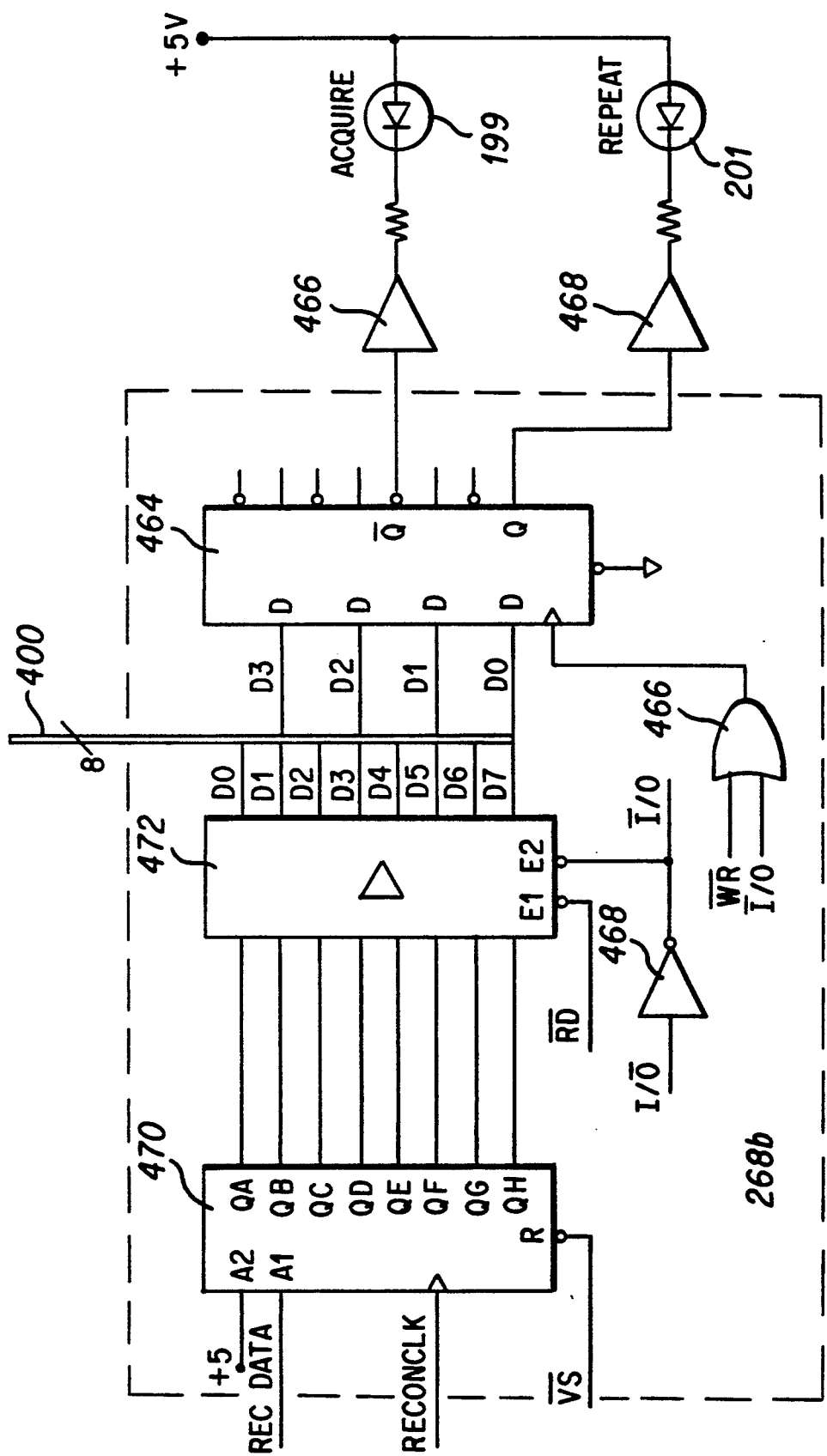

FIG. 9 shows a further portion 268b of encoder circuit 268. A quad D-type latch 464 has its D inputs connected to data lines D0-D3 of bus 400, its clock input connected to receive the output of an O R gate 434, and Q and Q* outputs converted through drivers 466 and 468 respectively to drive LED indicators 199 and 201. A serial in, parallel-out encoder 470 (such as type HC164) is connected to receive signals REC DATA ("received data") and RECOV CLK ("recover clock") at respective A1 and clock inputs, and vertical sync signal VS* at its reset input. Outputs QA-QH of encoder 470 are connected to respective input ports of a shift register driver 472 (such as type HC541). Signals RD* (from microprocessor 274) and $\overline{IO}$ are supplied to the E1 and E2 inputs of shift register 472, and the output of shift register 472 are connected to respective lines D0-D7 of bus 400.

Figure 10:
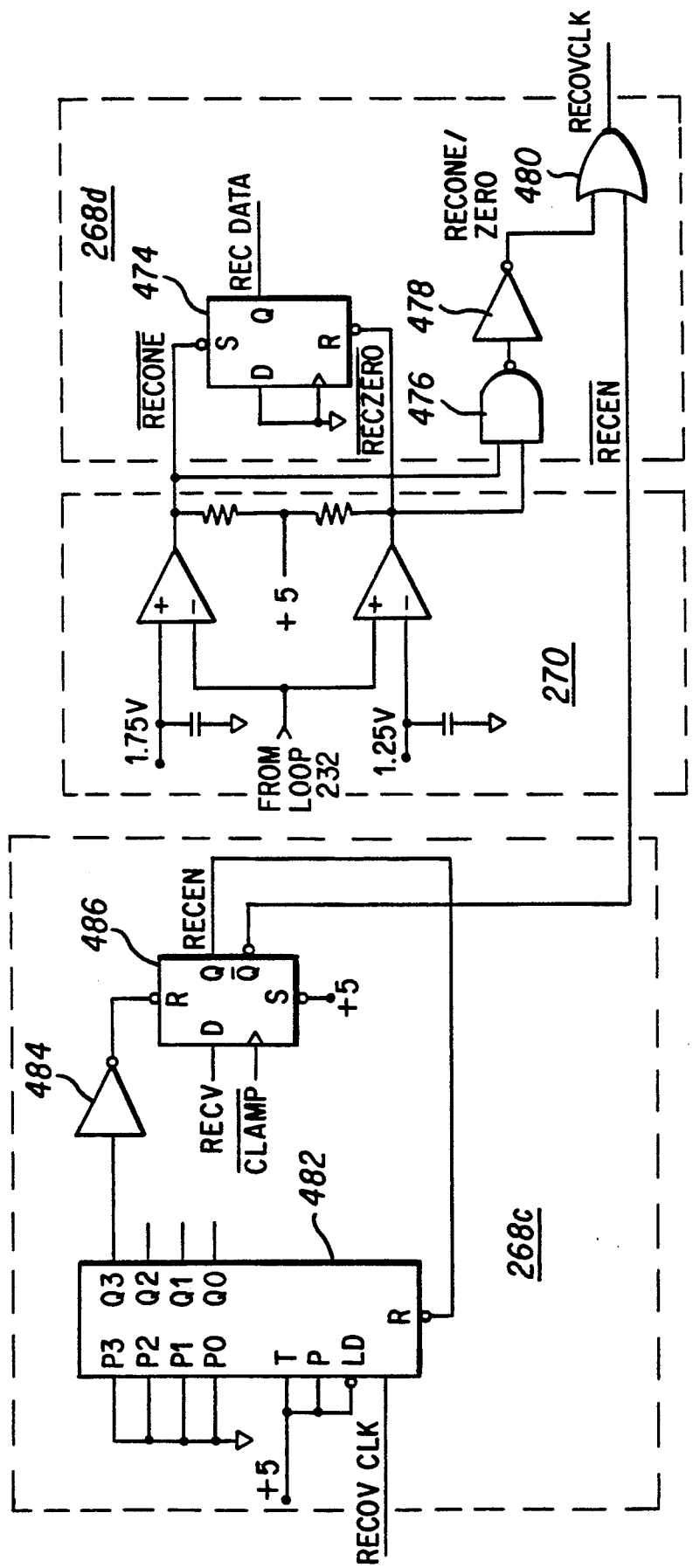

FIG. 10 shows additional portions 268c and 268d of encoder circuit 268. As shown in FIG. 10, incoming signals from loop 232 are compared in comparator 270 with +1.75 volt and +1.25 volt reference sources. Values greater than +1.75 volt cause active-low signal REC ONE* (line 4 of FIG. 14) to set a latch 474, such that signal REC DATA at is Q output assumes a logic high ("one") level. Values less than +1.25 volt cause active-low signal REC ZERO* (line 3 of FIG. 14) to reset flip-flow 474, such that signal REC DATA at its Q output assumes anodic low ("zero") level. Thus, the signal REC DATA (line 5 of FIG. 14) at the Q output of flip-flop 474 represents digital information recovered from the communications bus of which loop 232 forms a part. Signals REC ONE* and REC ZERO* are logically ANDed together by the combination of a Schmitt-trigger type NAND gate 476 and an inverter 478, to produce a signal REC ONE/ZERO (line 6 of FIG. 14). Signal REC ONE/ZERO is logically ORed with receive enable signal RECEN* (line 2 of FIG. 14) to produce a recovered clock signal RECOVCLK (line 7 of FIG. 14).

A divide-by-8 counter 482 receives recovered clock signal RECOVCLK at its clock input, and supplies a pulse from its Q3 output via inverter 484 to the active-low rest input of a latch 486, producing a signal RECEN to reset counter 482 after each set of eight received clock pulses. The active-low Q* output of latch 486 provides signal RECEN*.

Figure 14:
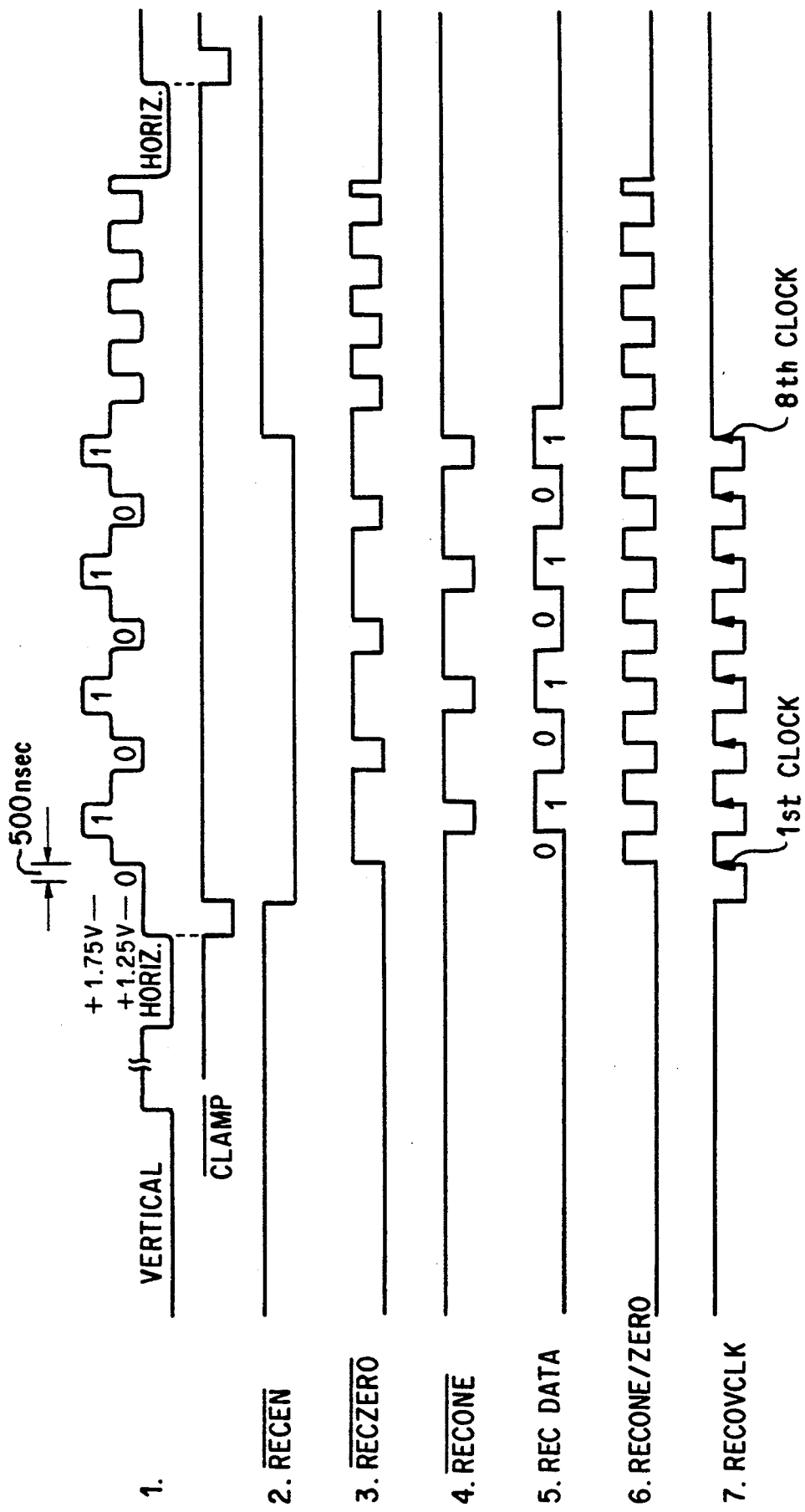

When a signal such as that of line 1 of FIG. 14 is received at the VCU, the recovered click signal RECOVCLK is produced, consisting of eight clock pulses recovered from the incoming data signal during a horizontal line of the vertical blanking interval. Recovered data signal REC DATA Is also produced, carrying of eight bits of digital information. Signal RECOVCLK clock signal REC DATA signal into serial-to-parallel converter 470, from which it is passed by read port driver 472 to microprocessor 274 via data bus 400 when commanded to do so by microprocessor 274.

Figure 15:
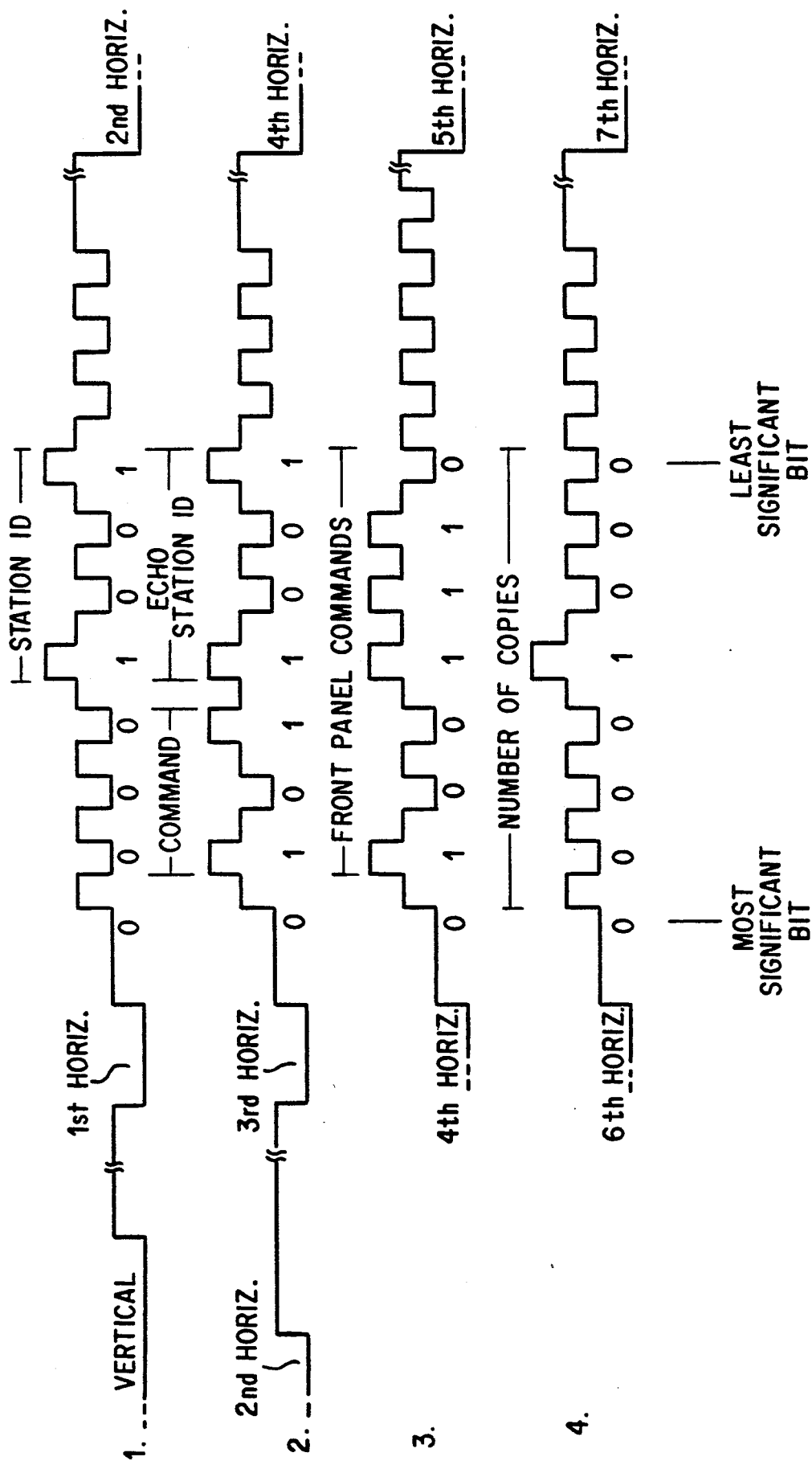
FIG. 15 shows a preferred protocol for communication between the VPU and the VCUs.

Thus, the VCU is capable of sending to the VPU and receiving from the VPU digital data and clock data during the vertical blanking interval of the workstation (or RGB camera) to which the VCU is connected. When the communications bus is "not busy" and acquire switch 198 of a VCU is closed by the user, a "handshaking" communication sequence is initiated between the VCU and VPU. The communication protocol employed will now be described with reference to FIG. 15. During the first horizontal line following each vertical blanking pulse when the VCU is transmitting, eight bits of data are transmitted from the VCU to the VPU. The first four bits transmitted are zeros, and the last four bits transmitted represent the unique identification number of the VCU, set by channel select switch 272 upon installation of the VCU. In the example of line 1 of FIG. 15, the VCU identification number is "9" or, in binary form, 1001. During the second horizontal line following each vertical blanking pulse, the VPU processes the incoming data from the VCU. Receipt of a VCU station identification at the VPU signals the VPU that the identified VCU is ready to transmit an image to the VPU. During the third horizontal line following each vertical blanking pulse, the VPU sends an 8-bit reply to the VCU, an example of which is shown in line 2 of FIG. 15; the most significant bit is a zero and serves as a start bit, the next three bits are a command to send an R, G, or B video signal, and the final four bits echo the VCU identification as a "handshake" to acknowledge that the VPU is ready to receive video signals from the identified VCU. During the fourth horizontal line following each vertical blanking pulse, the VCU transmits a further 8-bit message, an example of which is shown in line 3 of FIG. 15; the first bit is a zero and serves as a start bit, and the next seven bits represent the status of the plot parameter switch settings of the VCU. During the fifth horizontal line following each vertical blanking pulse, the VPU processes the incoming data from the VCU. During the sixth horizontal line following each vertical blanking pulse, the VCU may transmit yet another 8-bit message, an example of which is shown in line 4 of FIG. 15, indicating the number of copies of the plot to be prepared.

Once a complete frame of R video signals has been received at the VPU, the VPU commands the VCU to send G video signals. Once a complete frame of G video signals has been received at the VPU, the VPU commands the VCU to send B video signals. Once a complete frame of B video signals has been received at the VPU, the communication on the video bus ends and the VPU starts its rendering process, i.e., converts RGB signals to CMY (cyan, magenta, yellow) and commences the plotting process.

Figure 16:
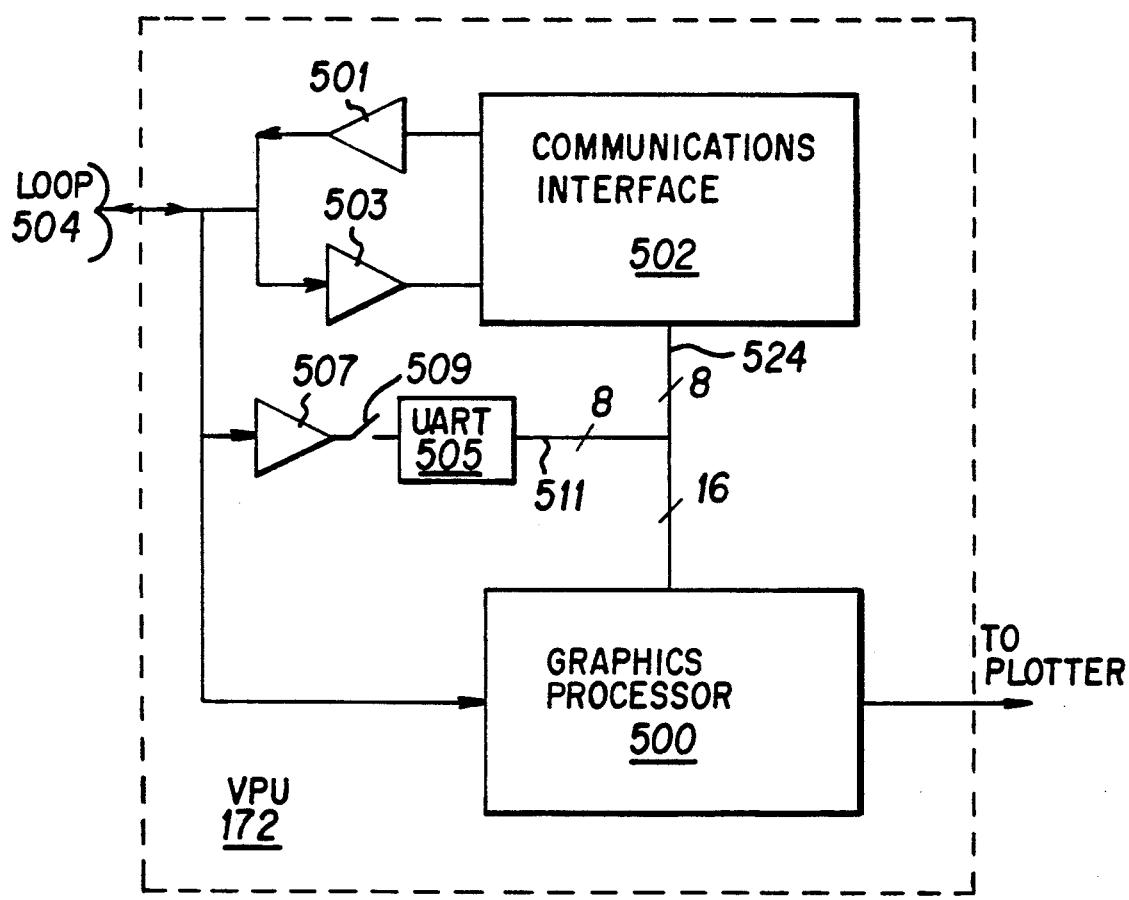
FIG. 16 is a schematic block diagram of a first preferred embodiment of the VPU in accordance with the invention.

If the VCU and VPU are equipped with optional serial data transmission capability (as described above with reference to FIG. 4 and below with reference to FIG. 16), the communication protocol may also advantageously include communication of a digital command from the VCU to the VPU to cause the VPU to prepare for reception of serial data via the communications bus. With such a capability, the user may transmit an image file stored digitally in a storage device (such as a hard disk) of the workstation to the plotter without first displaying the image on the workstation display screen.

PREFERRED EMBODIMENTS OF THE VIDEO PROCESSING UNIT

A first embodiment of The VPU unit 172 will now be described with reference to FIGS. 16–20. The VPU 172 shown schematically in FIG. 16 preferably comprises a conventional graphics processor unit 500 (which receives RGB and sync signals at its inputs, processes the received information into bit-mapped format, and drives the selected plotter) modified to interface to the video bus (loop 504), and a communications interface circuit 520 which controls communications between graphics processor 500 and the VCUs. Graphics processor unit 500 may, for example, be a Color Image Processor Model 8666 now Océ Graphics model G8520 ) available from Schlumberger Graphics of Mountain View, California now Océ Graphics USA of Mountain View, California, or a model VP240 graphics processor available from Graftel Limited of Dublin, Ireland, or may be the graphics processor incorporated in model GAMMACOLOR C system available from Gammadata Computer GmbH of Germering, Federal Republic of Germany. The communications interface circuit 502 is connected to the center tap of loop 504 through respective transmit and receive amplifiers 501 and 503, and to graphics processor 500 via a 8-bit data bus 542. Graphics processor 500 is connected to the center tap of 75-$\Omega$ through-loop 504. If the VPU is to be equipped for optional serial data reception, a conventional universal asynchronous receiver-transmitter (UART) 505 is connected via a receive amplifier 507 and a controlled switch 509 to the center tap of loop 504 and via an 8-bit data bus 511 to the data bus of graphics processor 500.

Figure 17:
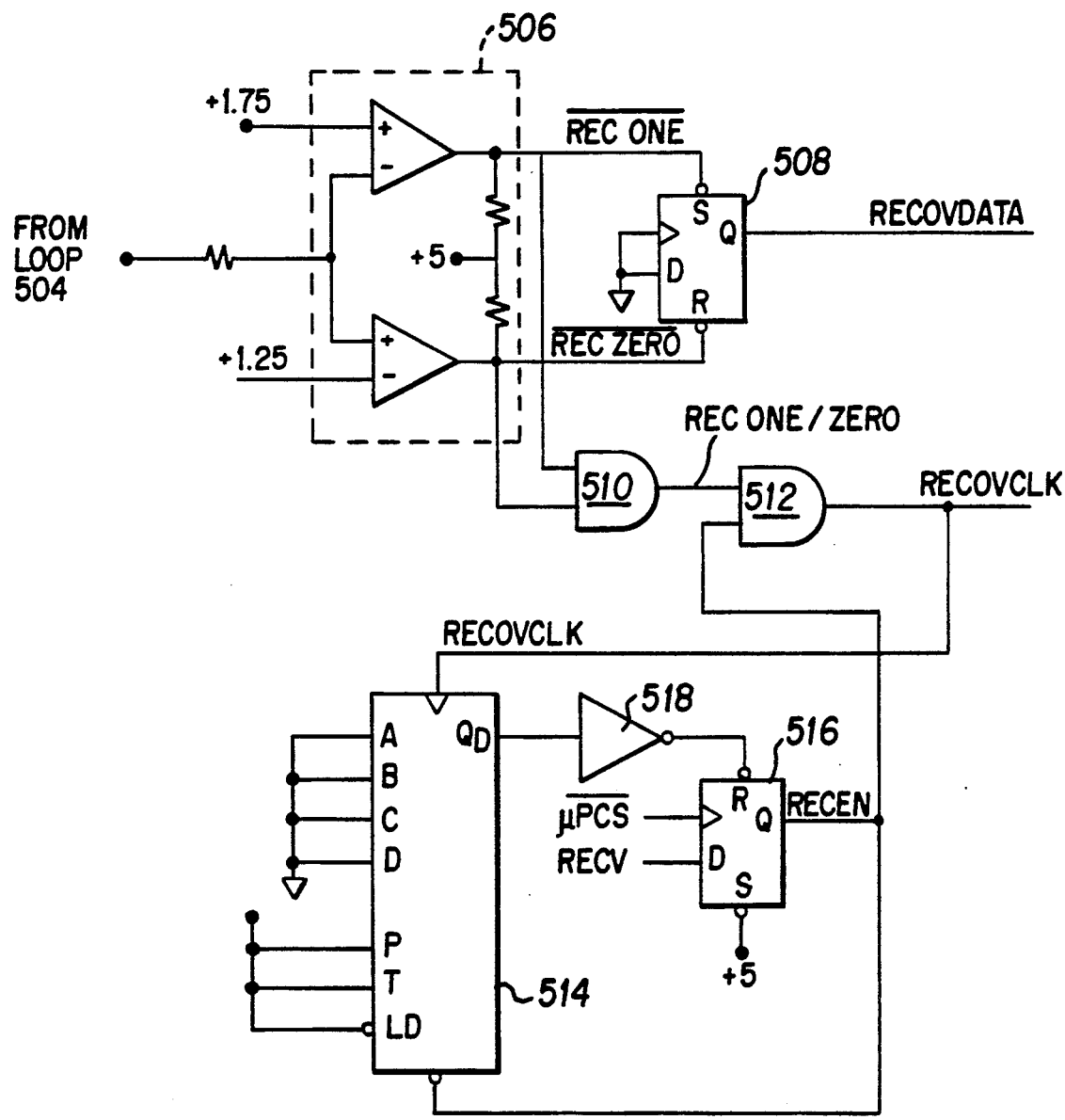
FIGS. 17–19 show the communications interface circuitry of the preferred VPU embodiment of FIG. 16.
Figure 18:
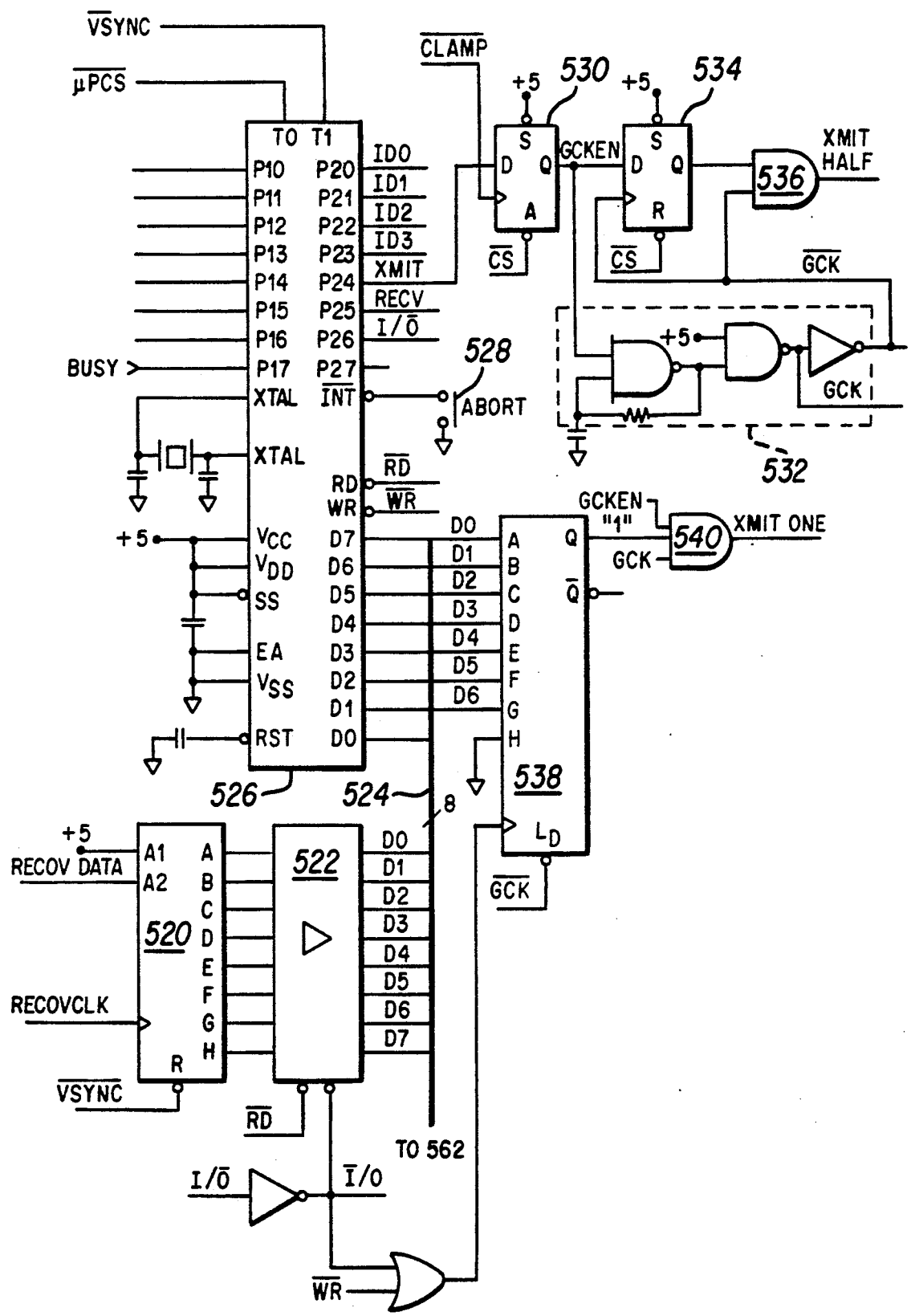
Figure 19:
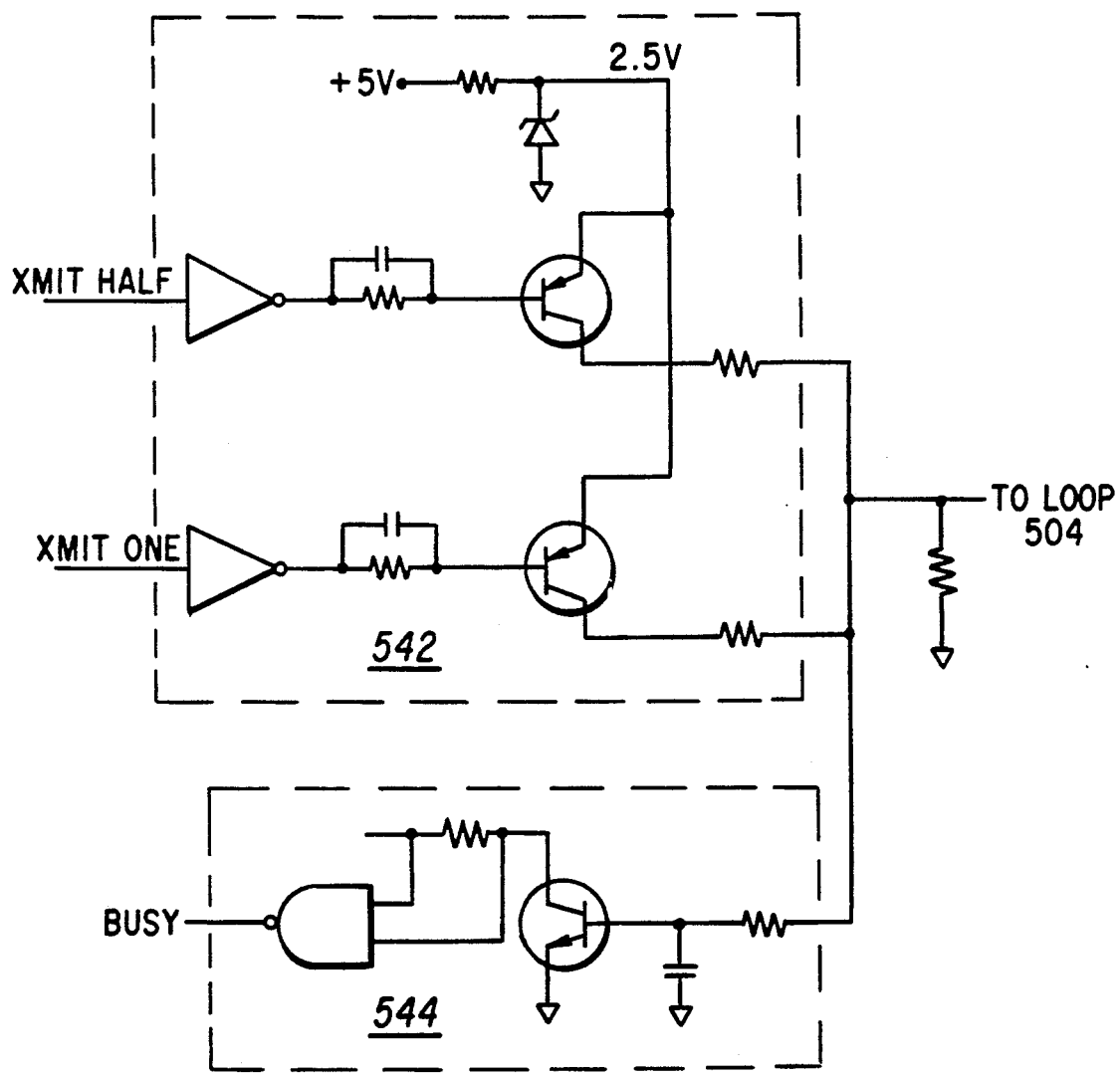

A preferred form of communications interface circuit 502 is illustrated in FIGS. 17–19. As shown in FIG. 17, a comparator 506 compares the incoming signal from loop 504 with +1.75 and +1.25 volt reference sources, and supplies output signals REC ONE* and REC ZERO* (lines 4 and 3 of FIG. 14, respectively) to the active-low set and active-low reset inputs of a latch 508. Latch 508 produces a recovered data signal RECOVDATA at its Q output. Signals REC ONE* and REC ZERO* are logically ANDed together by AND gate 510 to produce a signal REC ONE/ZERO (line 6 of FIG. 14). Signal REC ONE/ZERO is gated through an AND gate 512 by a signal RECEN to produce a RECOV CLK signal (line 7 of FIG. 14). A divide-by-8 counter 514 (such as type HC161) receives signal RECOV CLK at its clock input, and supplies at the end of each set of eight clock pulses a reset signal from its $Q_D$ output to the active-low reset input of a flip-flop 516 via an invertor 518. Flip-flop 516 receives a horizontal sync signal (labelled $\mu$PCS*) from graphics processor 500 at its clock input and a signal RECV (from microprocessor 526 of FIG. 18) at its D input. The Q output of flip-flop 516 supplies signal RECEN, which is at a logic high level for the duration of eight clock pulses, to AND gate 512.

Output signals RECOVDATA and RECOVCLK from the circuit of FIG. 17 are supplied respectively to the A2 and clock inputs of a serial to parallel converter 520 of the circuit of FIG. 18 such that 8-bit segments of digital data recovered from the communications bus are clocked into a read port driver 522 (such as type HC541) during each horizontal line when data is received from a VCU. Converter 520 also receives a vertical sync signal (labelled VSYNC*) from graphics processor 500 at its active-low reset input, causing it to reset after each vertical sync pulse. Data from read port driver 522 is passed via conductors D0–D7 of a microprocessor bus 524 to a microprocessor 526 when so commanded by signals RD* and ĪO from microprocessor 526. Signals ID0, ID1, ID2 and ID3, representing the four-bit VCU address recovered from the communications bus, are available at respective lines 0–3 of port 2 of microprocessor 526. Signals XMIT, RECV and I/Ō are supplied from lines 4–6 of port 2. An abort switch 528 maybe connected to the INT* port as shown to permit the user to cancel transmission of a plot at the VPU. The active-low RD and WR ports of microprocessor 526 provide active-low read and write signals RD* and WR*, respectively, for control of data to and from microprocessor 526 via bus 524.

Additional circuitry of the first preferred embodiment of communications interface 502 shown in FIGS. 18 and 19 is provided for transmitting data to the VCUs. A flip-flop 530 receives a signal CLAMP* (line 3 of FIG. 13) from graphics processor 500 at its clock input, signal XMIT (line 11 of FIG. 13) at its D input, and a signal CS* from graphics processor 500 at its active-low reset input. A gated clock subcircuit 532 receives a signal GCKEN (line 4 of FIG. 13) and supplies at its output a set of complementary 1 MHz clock signals GCK (line 5 of FIG. 13) and GCK*. A latch 534 receives signal GCKEN at its D input, signal GCK* at its clock input, and signal CS* at its active-low reset input. The signal at the Q output of latch 534 gates the GCK* signal in an AND gate 536 to produce a signal XMIT HALF (line 7 of FIG. 13).

A parallel to serial converter 538 (such as type HC165) has its input ports A–G connected to bus 524, its H port (most significant bit) connected to a logic low level, and its active-low LD port connected to receive signal GCK*. Signals WR* and ĪO are logically ORed and supplied to the clock input of converter 538. Logics "1"s to be transmitted to a VCU are provided at the Q output of converter 538, then gated by signals GCKEN and GCK in an AND gate 540 to produce a signal XMIT ONE (line 11 of FIG. 13). It will be recalled that the bus clamp circuit 264 of a VCU maintains the communications bus at a level of +1.0 volt during the communication session with the VPU, such that the VPU need modulate this value with the clock and "1" information to be transmitted during the "handshake" communication. The XMIT HALF and XMIT ONE signals are supplied to respective inputs of a transmit modulator circuit 542 (FIG. 19), which modulates the level on the communications bus via loop 504 with the transmitted digital data. A busy detect circuit 544 detects the DC level at the center tap of loop 504 to send a signal BUSY to line 7 of port 1 of microprocessor 526. Microprocessor 526 in turn passes the "busy" message to microprocessor 588 via 8-bit data bus 524, the latter being connected to 8-bits of the 16-bit data bus 562 of microprocessor 588 (FIG. 20).

Figure 20:
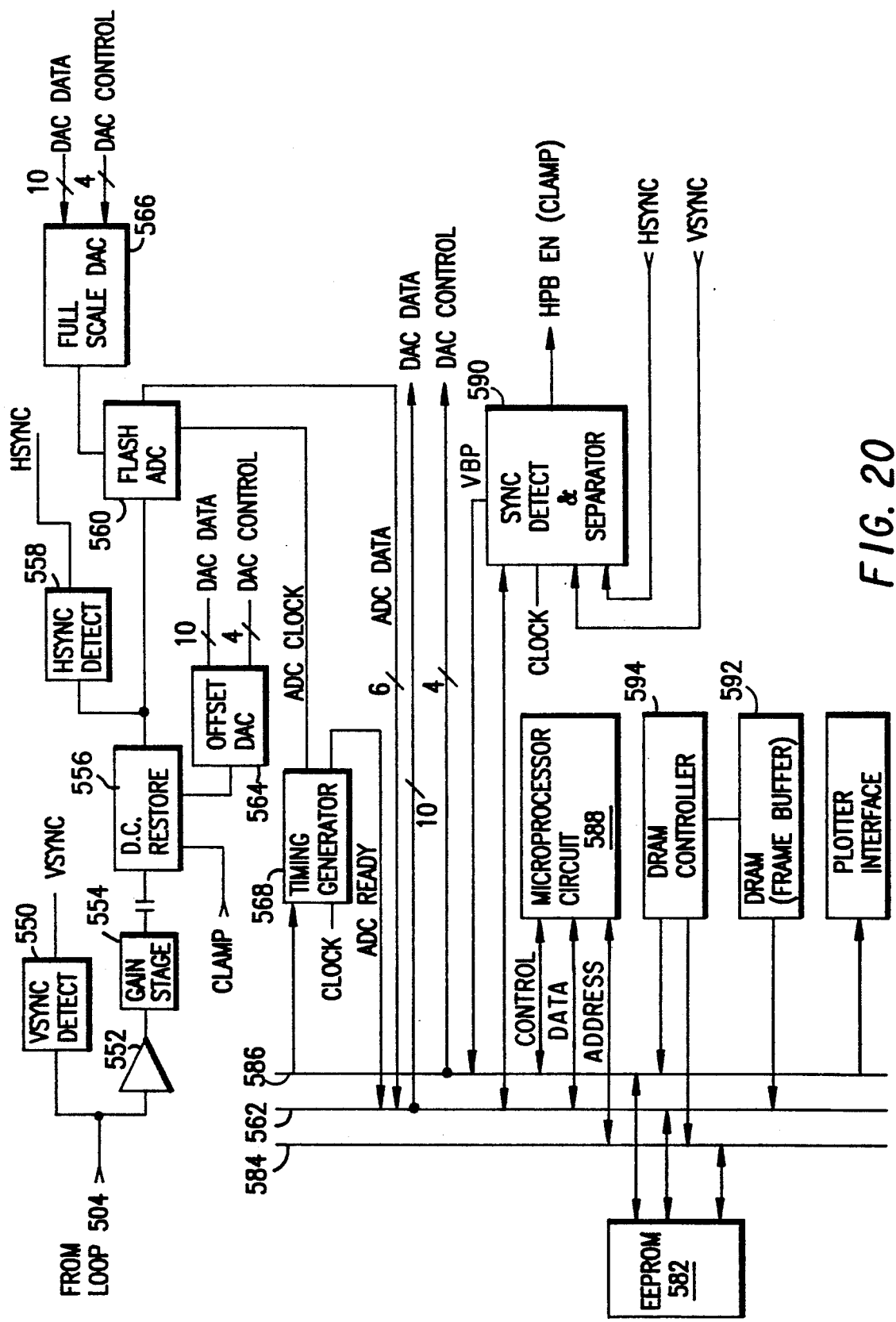
FIG. 20 is a schematic block digram of the graphics processor portion of the preferred VPU embodiment of FIG. 16.
Figure 21:
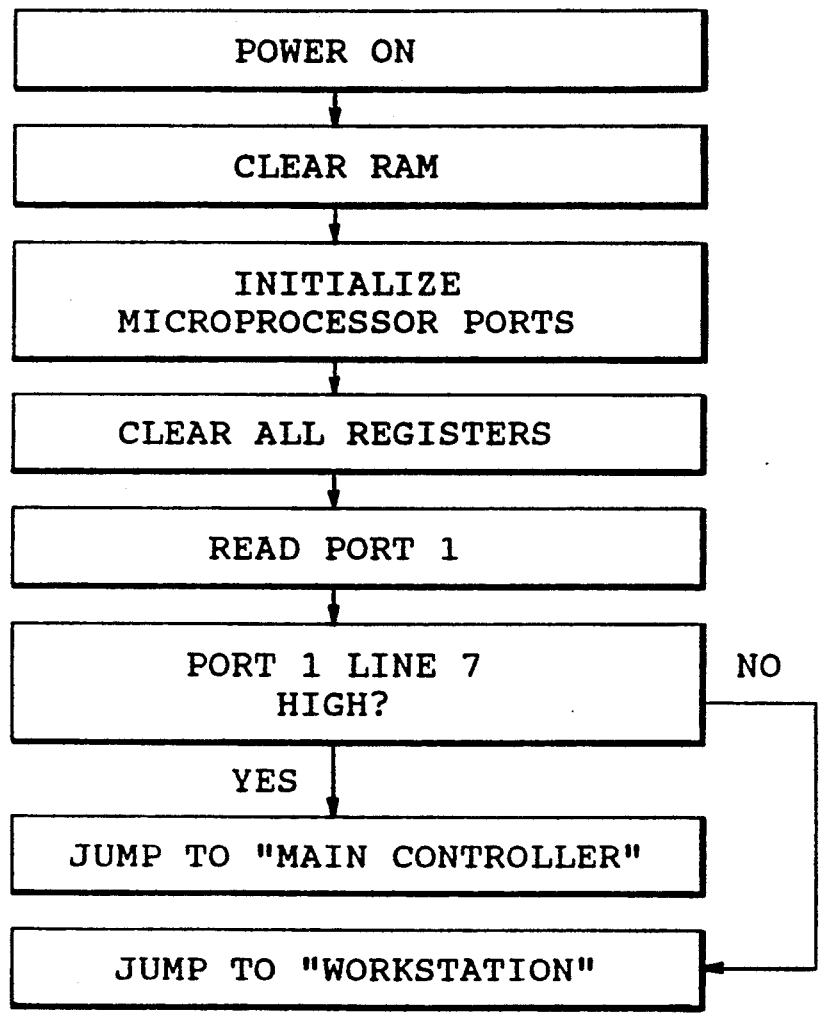
FIGS. 21–31 are flow charts of the preferred operation of communications microprocessors in the preferred VPU and VCU embodiments of FIGS. 2–20.
Figure 22:
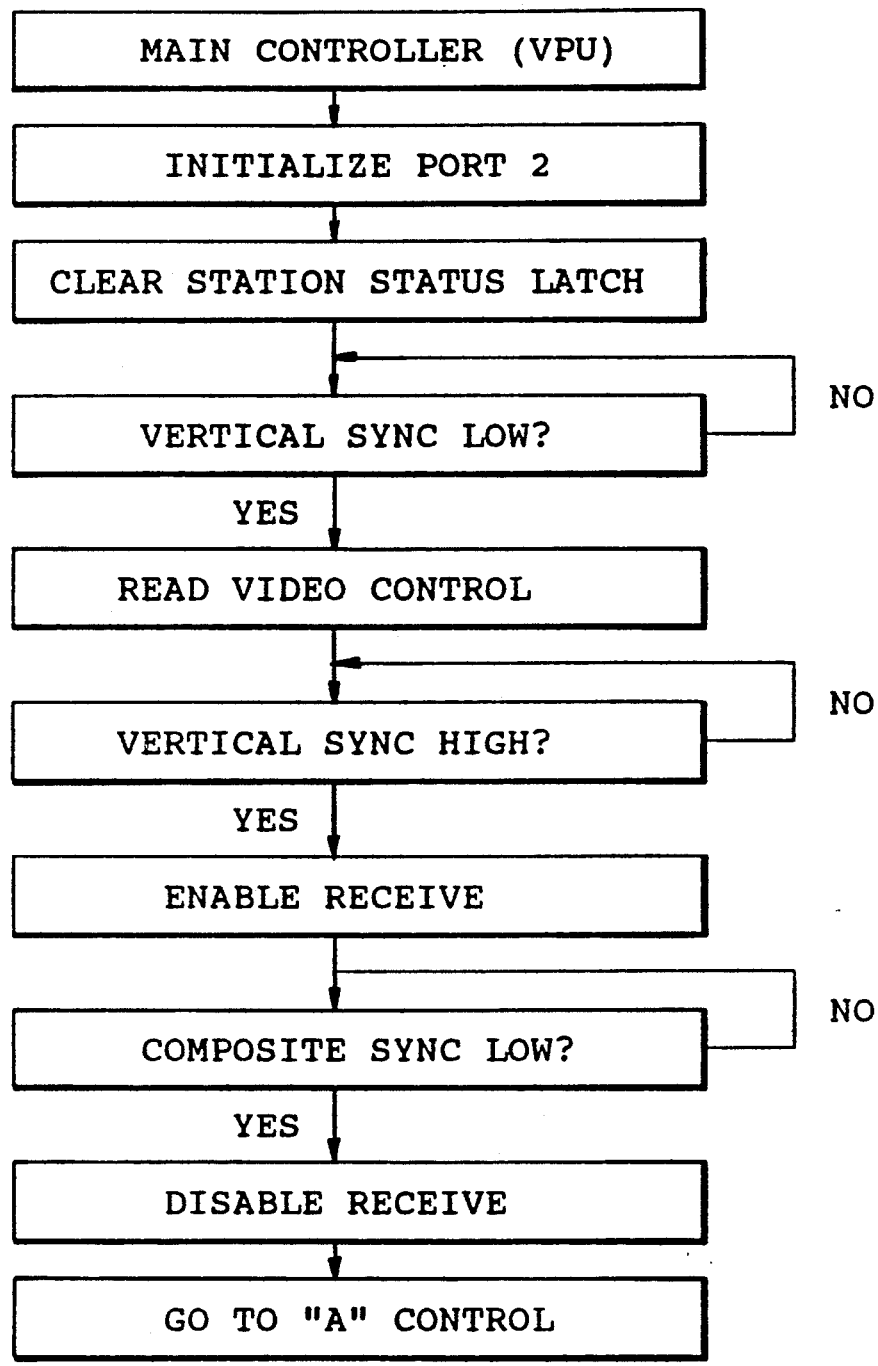
Figure 23:
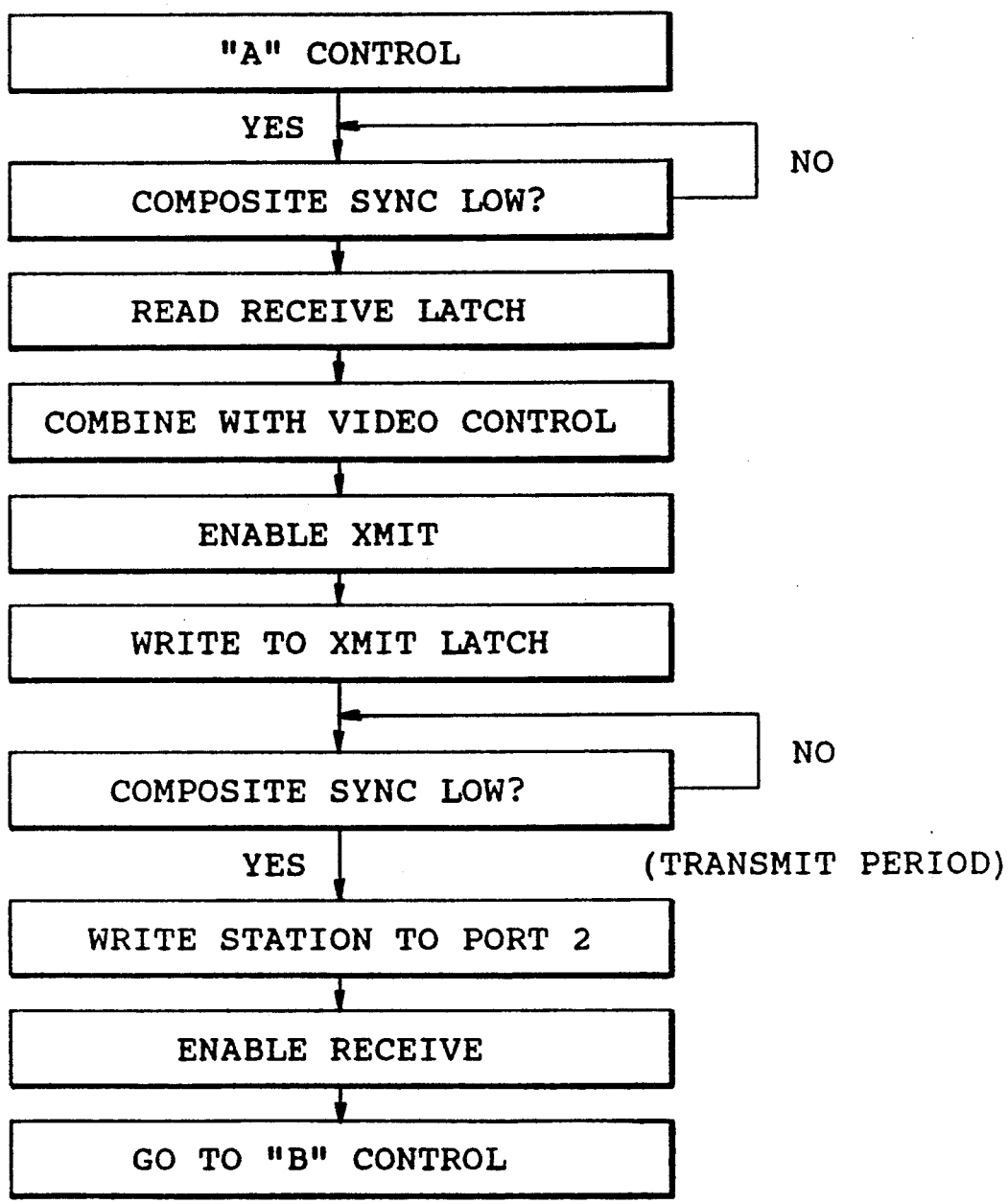
Figure 24:
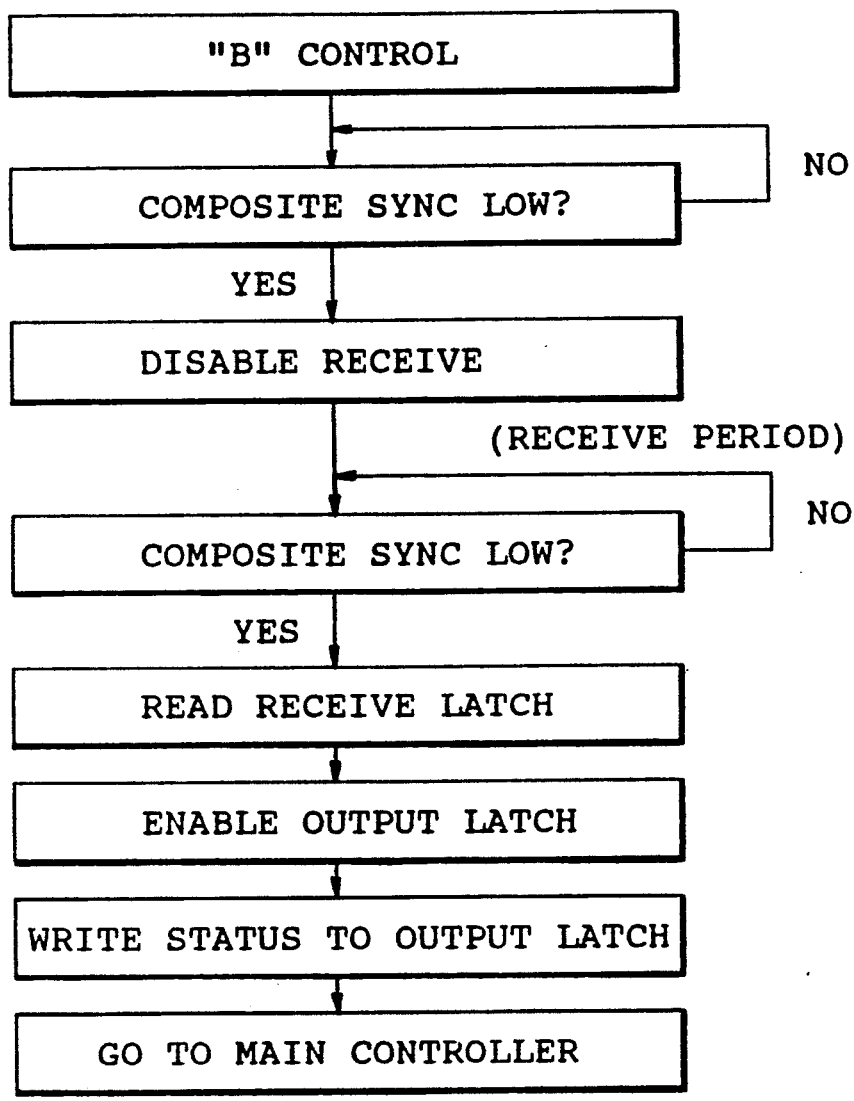
Figure 25:
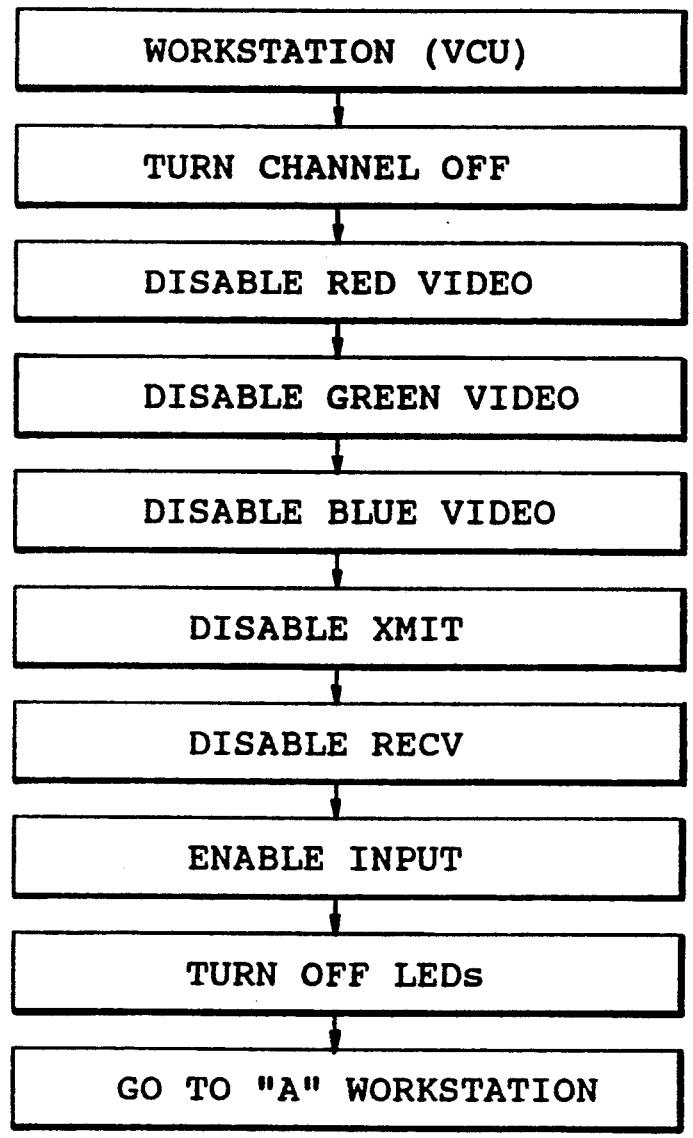
Figure 26:
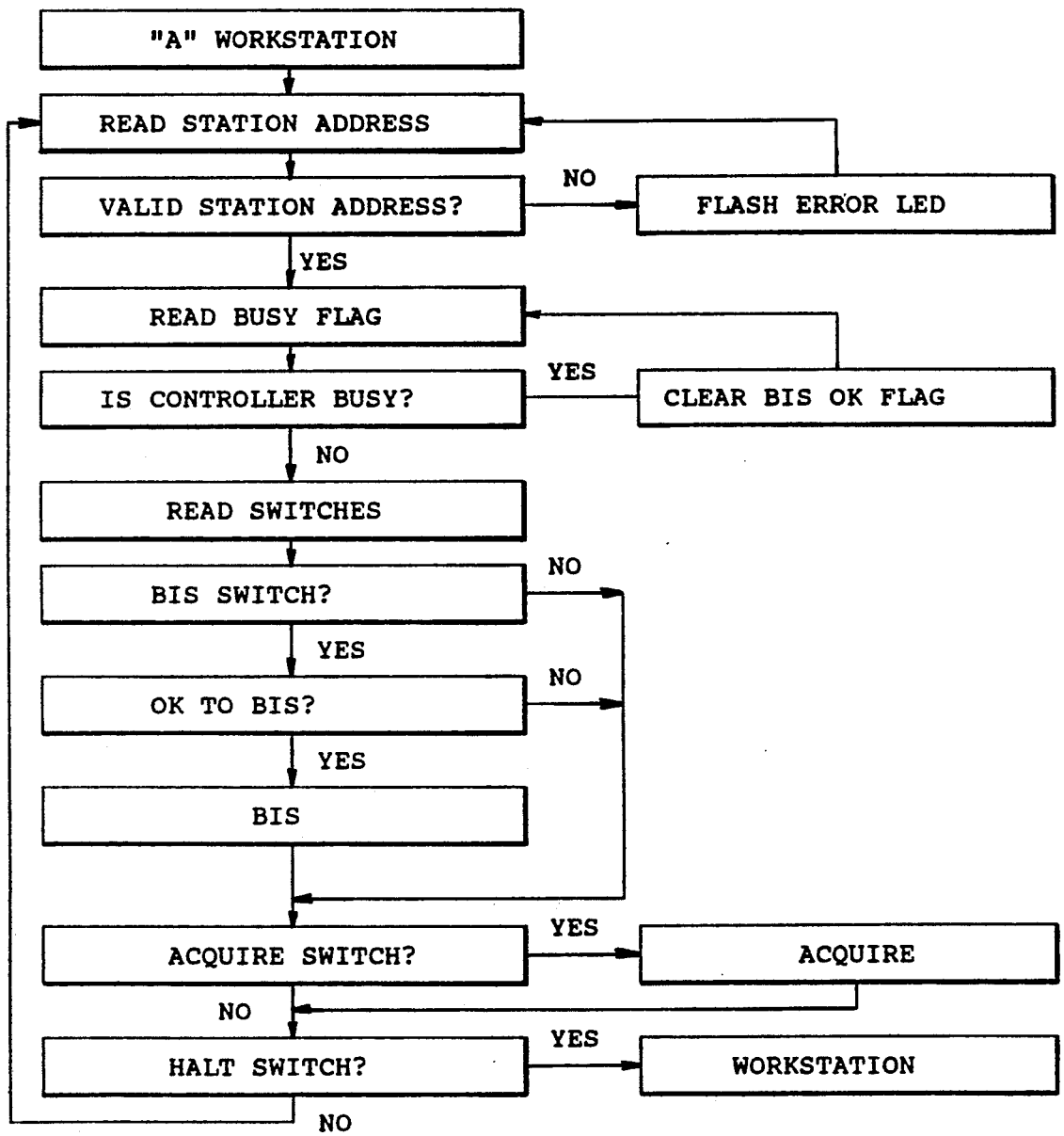
Figure 27:
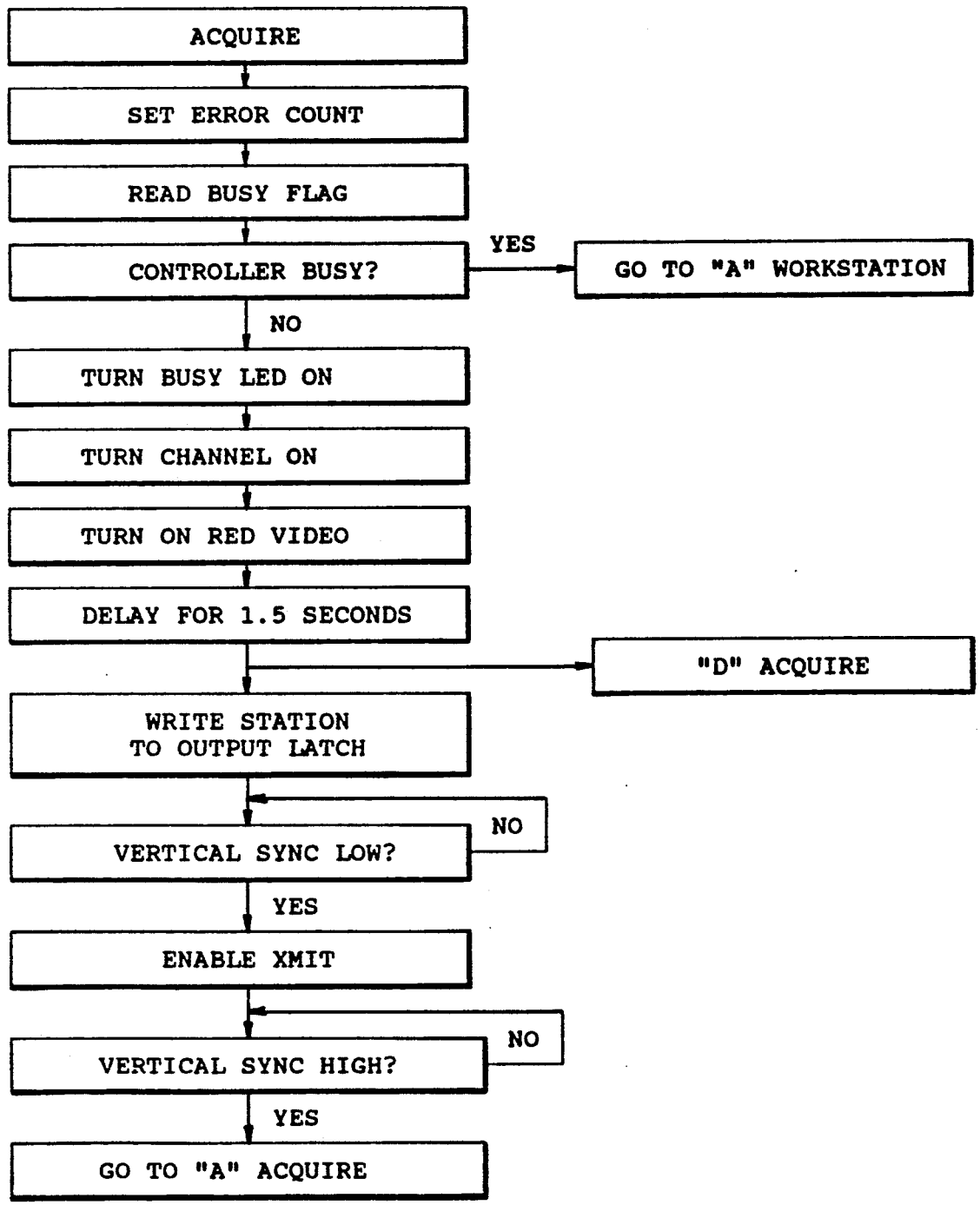
Figure 28:
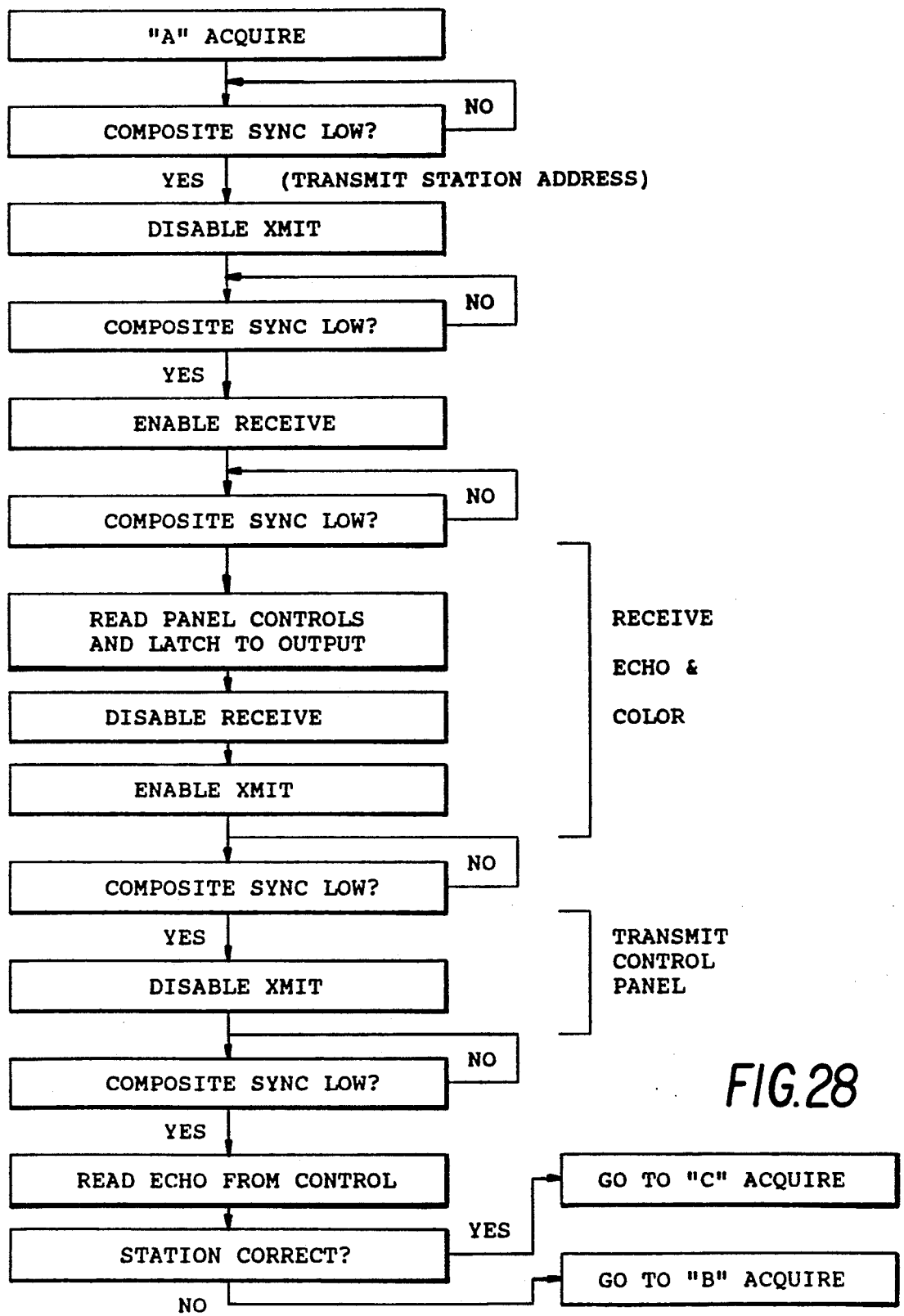
Figure 29:
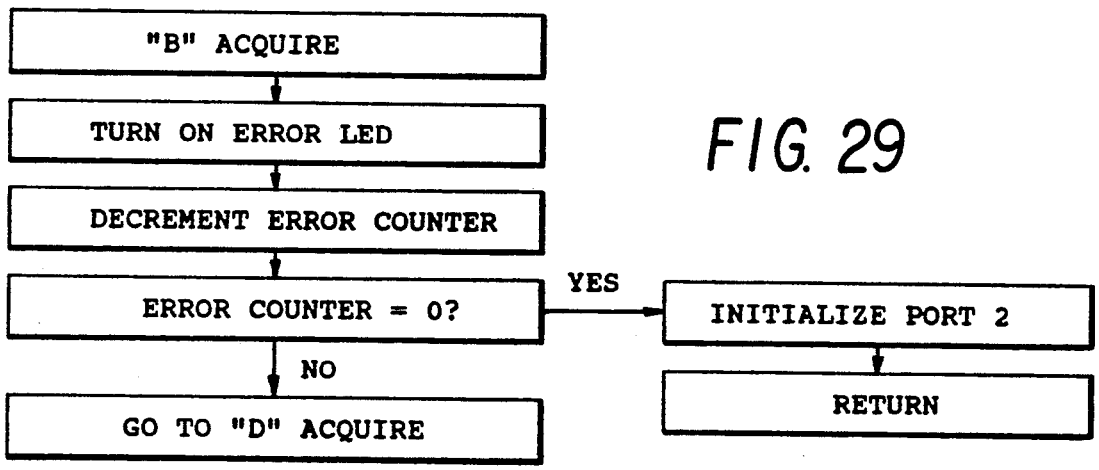
Figure 30:
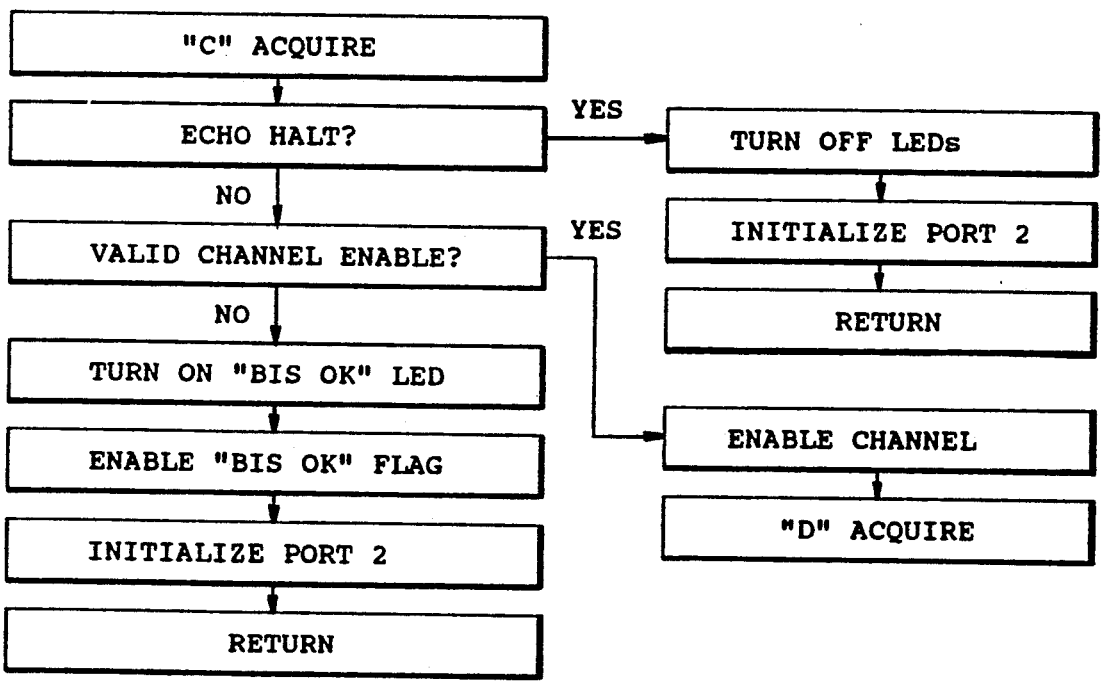
Figure 31:
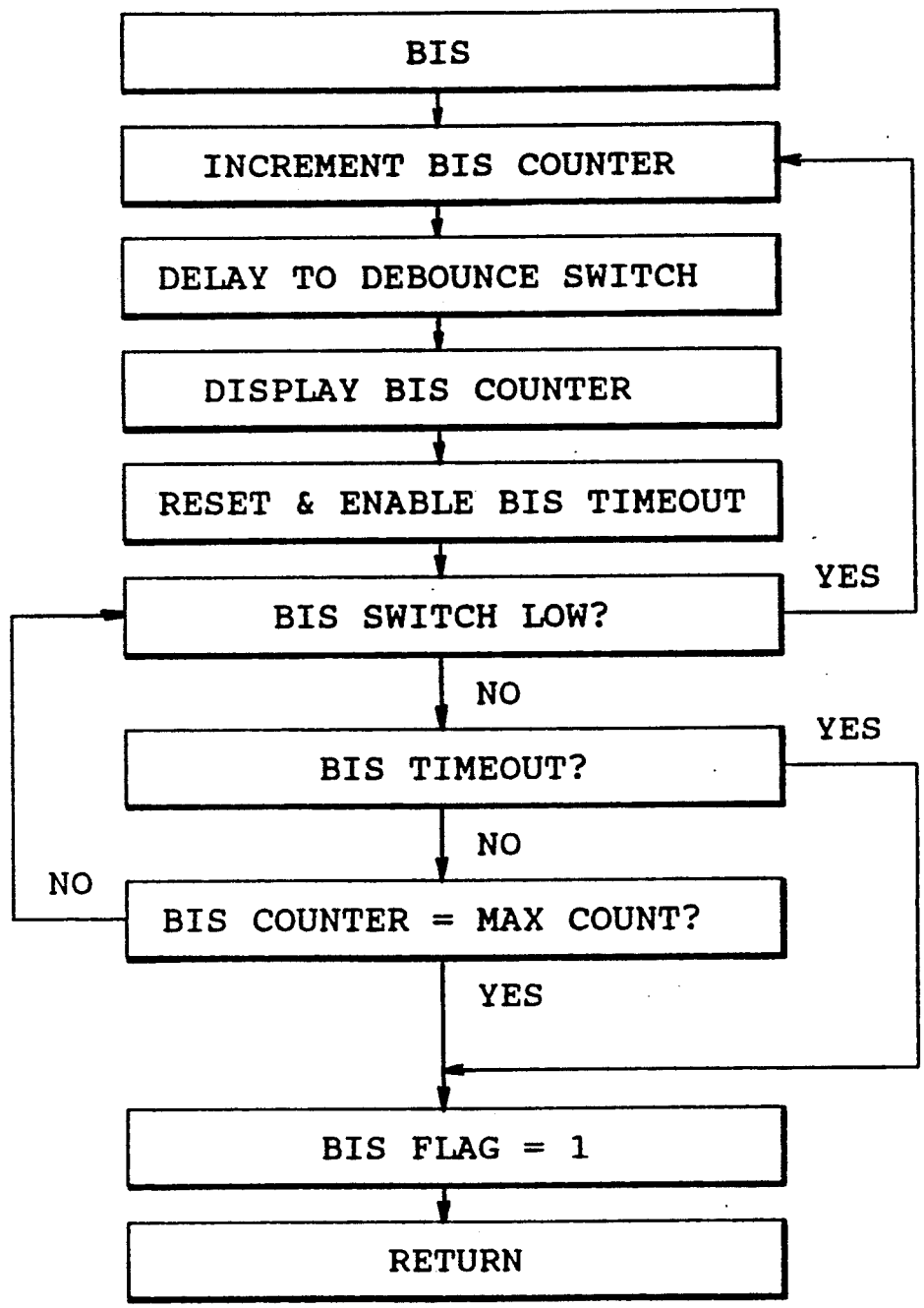

FIG. 20 shows in schematic block diagram form one type of conventional graphics processor, such as the Color Image Processor produced by Schlumberger Graphics of Mountain View, California. Other processors will have similar functions, but may implement them differently, for example by using phase-locked-loop or other techniques to digitize the incoming video signals. Incoming video signals (from loop 504) are supplied to a vertical sync detector 550, which produces a vertical sync signal VSYNC, and through a buffer 552, gain stage 554 and an AC-coupling capacitor to a DC restore circuit 556. A horizontal sync detect circuit strips horizontal sync information from the output of DC restore circuit 556, producing a signal HSYNC. A flash analog-to digital converter 560 digitizes the analog video signals from the output of DC restore circuit 556, supplying the data to a data bus 562. Digital to analog converters 564 and 566 (or any circuits performing a similar function) set the offset and full-scale values of the conversion. A timing generator subcircuit 568 generates and supplies to flash converter 560 an ADC clock signal which enables sampling of the video signal at the appropriate time, e.g., at the peak of each video pixel.

Also as shown in FIG. 20, an EEPROM 582 supplies parameters concerning the video signal format and associated VCU address of each workstation, microcomputer and RGB camera from which the VPU is to receive images, and communicates with the microprocessor 588 via data bus 562, address bus 584 and control bus 586. For example, if the video signal is formatted for a 1280×1024 pixel display screen, the signal bandwidth is 108 MHz and the screen refresh rate (vertical blanking rate) is 60 Hz, this data will be stored in EEPROM 582 along with the associated VCU address and full-scale and offset data of each color for retrieval and use in digitizing the incoming signals.

An area is reserved in the EEPROM 582 for each VCU in which parameters concerning the workstation, microcomputer or RGB camera connected to the VCU are stored. During the "handshaking" between the particular VCU and the VPU, microprocessor 526 communicates its VCU address to the main microprocessor 588, which in turn retrieves these parameters from EEPROM 582 and loads them into the appropriate circuitry, such as the timing generator circuit 568.

Graphics processor 500 is controlled by microprocessor 588, which is typically a conventional 16-bit or 32-bit device. A sync detect and separator circuit 590 communicates with microprocessor 588 via data and control buses 562 and 586, receiving input signals HSYNC and VSYNC from detectors 558 and 550, and supplying a signal CLAMP ("horizontal blanking period enable") at an output. A DRAM frame buffer 592 communicates with data bus 562 under control of a DRAM controller 594 for storing and supplying to plotter 182 a bit-mapped image of the screen display to be plotted.

Microprocessor 274 of each VCU and microprocessor 526 of the preferred VPU embodiment described above operate under the control of a common program given in the Appendix hereto, flow charts of which are shown in FIGS. 21–31. Operation of microprocessor 274 as a VCU controller is effected by connecting line 7 of its port 1 (FIG. 8) to a logic low level. Operation of microprocessor 526 as a VPU controller is effected by connecting line 7 of its port 1 (FIG. 18) to a logic high level.

As noted above with reference to FIGS. 4 and 16, the VPU and the VCU with which it is communicating may be provided with the optional capability for serial data transmission. If so equipped, the VCU is preferably further programmed to sequentially perform the following steps when a serial-data transmit requires is received from the workstation: send an X-OFF character back to the workstation to stop further data transmission from the workstation; check to see that the communications bus is not in use (no "BUSY signal"); establish connection with the VPU using video/digital communications protocols (transmission of appropriate commands during horizontal blanking intervals, including the VCU station identification and an instruction to the VPU that it is to prepare to receive serial data); disable the video sync transmission circuit, maintaining the 1-volt "busy" signal bias on the communications bus; close switch 282 (FIG. 4) to connect the serial data source to the communications bus; and transmit an X-ON character to the workstation to restart transmission from the workstation. The VCU then preferably becomes passive in that serial data from the workstation is passed through the VCU to the communications bus without intervention from the VCU (other than level conversion and amplification in driver 256). During transmission of the serial data, the VCU preferably maintains the 1-volt bias on the communications bus to indicate that the communications bus is busy, and microprocessor 274 of the VCU preferably monitors the transmission for exceptional conditions such as time-outs and end of transmission by watching the UART for activity. When an end-of-transmission character is received, the 1-volt bias may be dropped to return the VCU to an idle state. If no characters are received for a predetermined time-out period, the serial-data transmission is preferably disabled as at the end of transmission and any further serial data received from the workstation is ignored until a recognizable command is received at the VCU. At the VPU (FIG. 16), the microprocessor of communications interface 502 is preferably programmed to close controlled switch 509 when a serial-data-transmission command is received, thereby engaging UART 505. The serial-data-transmission command also preferably causes graphics processor 500 to prepare for reception and processing of serial data. When the VCU drops the 1-volt bias on the communications bus, switch 509 is opened and graphics processor continues to process the serial data in conventional manner for driving the plotter.

Figure 32:
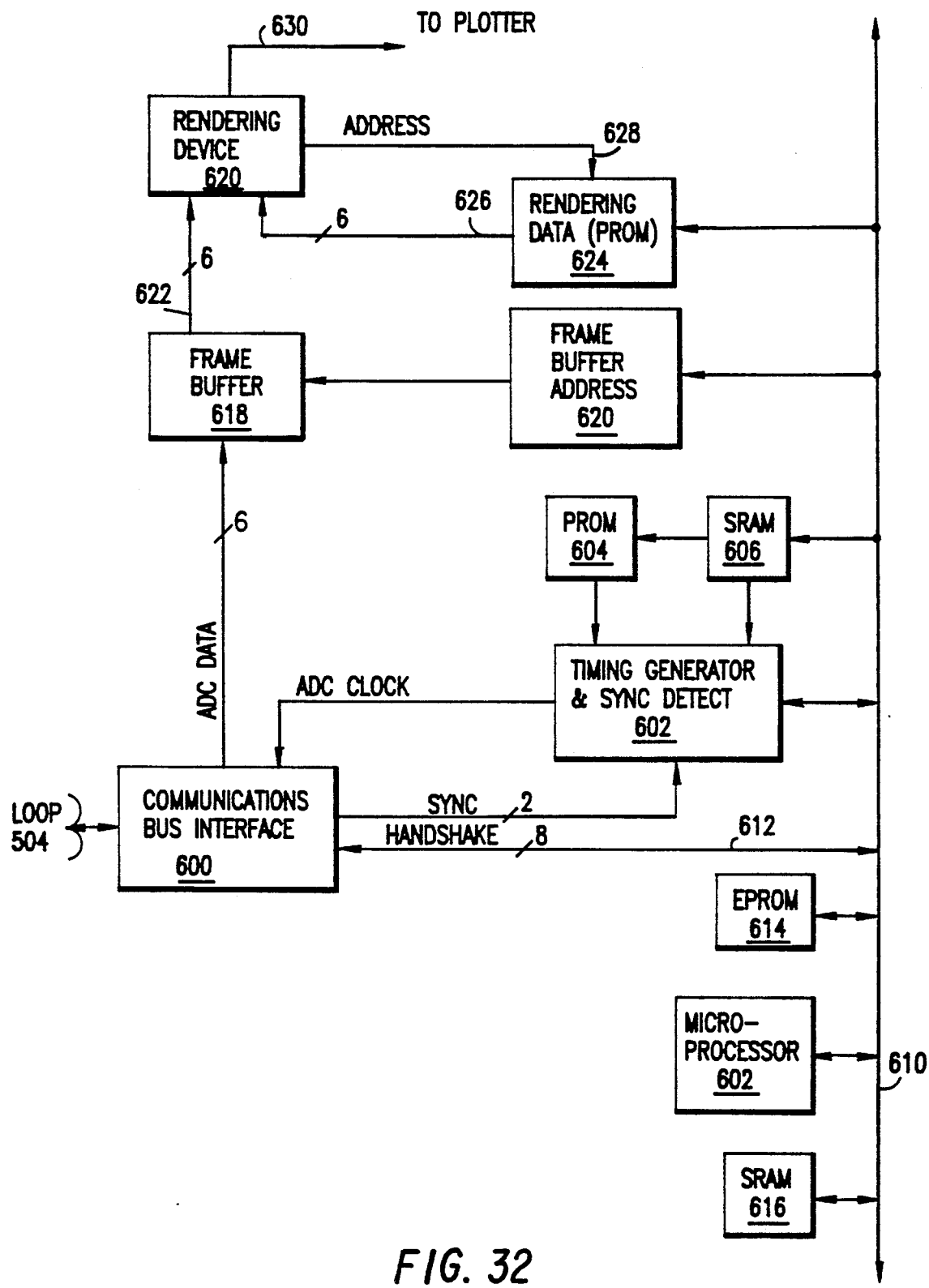
FIG. 32 is a block diagram of a second preferred embodiment of the VPU in accordance with the invention.

FIG. 32 shows in block form a second preferred embodiment of the VPU. A communications interface 600 is connected to receive signals from a video through-loop 504. Interface 600 includes a flash ADC converter which receives an ADC clock signal from a timing generator and sync detect circuit 602. Timing generator and sync detect circuit 602 receives synchronization information from interface 600, and other required information from a PROM 604 and SRAM 606 under control of a 16-bit microprocessor 608. Interface 600 communicates with the 16-bit data bus 610 of microprocessor 608 via an 8-bit data bus 612 for carrying out the VPU's portion of the "handshake" communication using, for example, the protocols described above. An EPROM 614 and an SRAM 616 communicate with microprocessor 608 via bus 610. EPROM 614 is preferably used to store the operating program instructions for microprocessor 608.

The conventional flash ADC converter of interface 600 converts video information received from loop 504 to digital data and supplies the digital data to a frame buffer 618, which stores the data in address defined by a frame buffer address controller 620. The VPU also preferably includes a rendering device 620, or other suitable means (such as a dithering processor) for preparing data from frame buffer 618 for submission to the plotter. Rendering device 620 is connected to receive the image data from frame buffer 618 via a multi-bit data bus 622 (which may for example be a 4-bit, 6-bit or an 8-bit bus) and rendering data employed in the rendering process from a PROM 624 via a data bus 626. Rendering device 620 may call for the rendering data as required via an address bus 628. Rendered image data is supplied to the plotter via ;a suitable connecting bus 630.

The present invention is not limited to the preferred embodiments described above. Those of skill in the art will recognize from the foregoing detailed description that many and varied modifications may be made within the spirit and scope of the present invention which is defined in the following claims.

APPENDIX

Copyright © 1988 Schlumberger Technologies Inc.

```
;       BENSON.ASM
;       To enable the correct set of software the following condition
;       must be met:
;       8748 Port 1 line 7 (pin 34 of 8748)
;               High  :  Main Controller (VPU)
;               Low   :  Station Controller (VCU)
```

```
;       SET PROGRAM TITLE
;       $TITLE  Benson Video Cable Driver V1.0
;       INCLUDE DEFINITION FILES
        include RAM.H           ;Definitions for RAM
        include STATION.H       ;Definitions for Station Controller
;       include CONTROL.H       ;Definitions for Main Controller
;       SET STARTING ADDRESS
        org 0000H               ;Program starts at 0000H
;       INCLUDE SOURCE FILES
        include PWRON>ASM       ;Code for power on initialization
        include CONTROL.ASM     ;Code for the MAIN Controller
        include STATION.ASM     ;Code for mainloop of Station Control
        org 0100H
        include ACQUIRE.ASM     ;Code to acquire the bus and transmit
        include WAIT.ASM        ;Code to generate delays
        include BIS.ASM         ;Code to repeat current image
;       DECLARE END OF FILE FOR ASSEMBLER
        end
        stop tcnt               ;stop timer
        ret
        =================================
```

===============================================

;   PWRON.ASM
;   This routine is executed upon power up of either
;   the Station Controller (VCU) or the Main Controller (VPU).
;   This routine takes control after the reset* line
;   of the microprocessor is released, clears the internal
;   RAM of the 8748 and determines if the controller is for
;   a station or the main control.  This routine will then
;   transfer control to the appropriate set of code.
;   Use: Invoked upon processor hardware reset
;   Input: None ; Returns: None. This routine does not execute a return,
; it will transfer control to one of the
; following routines:
; STATION.ASM  If hardware is a Workstation (VCU)
; CONTROL.ASM  If hardware is the Main Controller (VPU)
; RAM Usage: Will clear all 64 RAM locations to 00H
; Register Usage: ACC - Destroyed
;                 R0  - Cleared
;                 R1  - Cleared
;                 R2  - Cleared
;                 R3  - Cleared
;                 R4  - Cleared
;                 R5  - Cleared
;                 R6  - Cleared
;                 R7  - Cleared
; Subroutines: None
; Created : 88.11.12  Greta L Light
; SET SUBTITLE FOR THIS SECTION OF CODE
    $SUBTTL PWRON.ASM Power on reset
; PWRON
PWRON:   jmp CLRRAM
; LOCATE PROGRAM OUT OF INTERRUPT AREA
    org 0015H
; CLEAR THE RAM
CLRRAM:  mov r0,#BEGRAM    ;r0 = pointer to start of RAM
CLRR1:   clr a             ;ACC = 00H
         mov @r0,a         ;Clear RAM at pointer location
         inc r0            ;increment pointer to next RAM location
         mov a,r0          ;get current RAM pointer
         anl a,#ENDRAM     ;compare pointer to end of RAM
         jz CLRR1          ;If not end of RAM, continue to clear RAM
; INITIALIZE MICRO PORTS

```
        mov a,#0FFH         ;acc = all 1's
        outl p1,a           ;initialize port 1
        outl p2,a           ;initialize port 2
;       CLEAR ALL REGISTERS
        clr a               ;ACC = 0
        mov r0,a            ;Clear Register 0
        mov r1,a            ;Clear Register 1
        mov r2,a            ;Clear Register 2
        mov r3,a            ;Clear Register 3
        mov r4,a            ;Clear Register 4
        mov r5,a            ;Clear Register 5
        mov r6,a            ;Clear Register 6
        mov r7,a            ;Clear Register 7
;       READ PORT 1 and test
        in a,p1             ;ACC = Port 1
        jb7 CONTROL         ;if line 3 is high, hardware is the
        jmp STATION         ;Main controller otherwise hardware
                            ;is the Station controller
============================================
;       CONTROL.ASM
;       initialize port 2
CONTROL:
        mov a,#00H  ;get code to initialize port 2
        outl p2,a   ;initialize port 2
;       Clear station status in output latch
        mov a,#0FFH         ;get code for latch
        outl bus,a          ;write to latch
;       WAIT FOR VS TO GO LOW
CON1:   jt1 CON1    ;wait for vertical sync to go low
;       place code to mask lower bits in r1
        mov r1,#0FH         ;mask for lower 4 bits
        mov r0,#07H;mask for lower 3 bits
```

```
            mov r2,#50H ;mask for xmit and I/O
            mov r3,#0FFH
            mov r4,#60H
;           read video control
            in a,p1         ;get port 1
            anl a,r0        ;make video enable bits
            swap a          ;swap nibbles
;           WAIT FOR VS TO GO HIGH
CON2:       jnt1 CON2       ;wait for vertical sync to go high
;           enable receive
            orl p2,#60H     ;enable receive and make I/O high
;           WAIT FOR CS TO GO LOW
CON3A:      jt0 CON3A       ;wait for cs to go low
                            ;RECEIVE PERIOD
            anl p2,#0DFH    ;disable receive
            xch a,r0        ;save video enable
            movx a,@r1      ;clear input bus latch
;           WAIT FOR CS TO GO LOW
CON3:       jt0 CON3        ;wait for cs to go low
            ins a,bus       ;read input latch
            anl a,r1        ;mask station address
            orl p2,#50H     ;enable transmit
            orl a,r0        ;combine with video enable
            outl bus,a      ;write to xmit latch
;           WAIT FOR CS TO GO LOW
CON4:       jt0 CON4        ;wait for cs to go low
                            ;transmit period
            anl a,r1        ;mask video control and halt bit
            orl a,r4        ;make I/O* high and receive
            outl p2,a       ;write station to p2
;           WAIT FOR CS TO GO LOW
CON5:       jt0 CON5        ;wait for cs to go low
```

```
;RECEIVE PERIOD
        anl  p2,#0DFH     ;disable receive
        nop
        nop
;       WAIT FOR CS TO GO LOW
CON6:   jt0  CON6         ;wait for cs to go low
        movx a,@r1        ;clear input latch
        ins  a,bus        ;read input
        anl  p2,#0BFH     ;enable port 2 latch
        outl bus,a        ;echo to port 2   latch
        jmp  CON1
```

===============================================

;       STATION.ASM

;       The following code is to be executed when the hardware is

;       set for the local workstation.

;       Use : This routine is directly entered from the PWRON.ASM

;              routine if the hardware is set for the local workstation.

;       Input : None

;       Returns : None.  This is the MAIN loop for the workstation software.

;       RAM Usage : None

;       Register Usage : ACC - Destroyed

;                        Register 2 - Flags

;                        Register 3 - LED_STATUS

;       Subroutines : W500MS   - .500 second delay

;                     ACQUIRE  - Acquire bus and transmit image

;                     BIS      - repeat current image

;       Created : 88.11.12  Greta L Light

;       Revisions :

;              None.

;       SET SUBTITLE FOR THIS SECTION OF CODE $SUBTTL STATION.ASM Local Workstation

```
;       STATION.ASM
STATION:
;       Set the following initial conditions:
;               Channel off
;               Red Disabled
;               Green Disabled
;               Blue Disabled
;               XMIT Disabled
;               RECV Disabled
;               I/O* set for Input
        orl p2,#0FFH            ;initialize port 2 to all 1's
        anl p2,#INITP2          ;set port 2 initial values
;       TURN OFF LEDS
        mov a,#LEDOFF           ;get code to turn off all LEDs
        mov r3,a                ;initialize register 3
        outl bus,a              ;write code to led latch
;       ENABLE INPUT LATCHES
STAT1:  anl p2,#OUTLOW          ;make I/O* low to enable outputs
;       READ SYSTEM PORT
        movx a,@r0              ;clear output latch
        ins a,bus               ;ACC = system port
;       CHECK IF STATION ADDRESS IS VALID
;       * There are 16 possible combinations of station
;         addresses.  Two of the sixteen combinations are
;         invalid.  The invalid combinations are 00H and 0FH.
        anl a,#MASKLOW          ;mask unused bits
        mov r4,a                ;register 4 = current station
        jz STAT2                ;station = 0, invalid station, jump
        xrl a,#0FH              ;check if station = F H
        jz STAT2                ;station = 0, invalid station, jump
        jmp STAT3               ;check the Busy Flag
;       STATION ERROR, FLASH ERROR LED
```

```
STAT2:      orl p2,#INHIGH         ;make I/O* line low
            mov a,#ERRON           ;get code to turn on ERROR led
            anl a,r3               ;set condition in LED register
            mov r3,a               ;restore LED register
            outl bus,a             ;write to led latch
            call W500MS            ;delay for .5 seconds
            mov a,#ERROFF          ;turn of ERROR led
            orl a,r3               ;set condition in LED register
            mov r3,a               ;restore LED register
            outl bus,a             ;write to led latch
            call W500MS            ;delay for 500ms
            jmp STAT1              ;continue to sample station address
;     CHECK BUSY FLAG
STAT3:      movx a,@r0             ;clear output latch
            ins a,bus              ;ACC = system port
            jb7 STAT4              ;If Busy high, jump
;     If Busy was low, clear the BIS flag because
;     another system has taken control of the bus
;     The BIS flag is bit 0 of Register 2, also make
;     sure that the "OK to BIS" led is turned off.
            mov a,#CLRBIS          ;Get mask to clear the BIS flag
            anl a,r2               ;Clear BIS FLAG
            mov r2,a               ;Restore register 2
            mov a,#BISOFF          ;get code to turn off BIS LED
            orl a,r3               ;set condition is LED register
            mov r3,a               ;restore LED register
            orl p2,#INHIGH         ;enable write to LED latch
            outl bus,a             ;write LED status to latch
            anl p2,#OUTLOW         ;send I/O* line low
;     READ STATION SWITCHES
STAT4:      in a,p1                ;ACC = station switches
            jb1 STAT5              ;BIS switch inactive, jump
```

```
;       OK TO BIS?
        mov a,r2            ;get system flags
        anl a,#01H          ;mask BIS flag
        jz STAT5            ;It is not OK to BIS, jump
        call BIS            ;Repeat the last Image
;       ACQUIRE ?
STAT5:  in a,p1             ;ACC = station switches
        jb0 STAT6           ;ACQUIRE switch is inactive, jump
        call ACQUIRE        ;Acquire the system and transmit
;       HALT?
STAT6:  in a,p1             ;ACC = station switches
        jb2 STAT1           ;HALT switch is inactive
        jmp STATION         ;reset system and continue
;*************************
; END STATION.ASM
;*************************
```

```
======================================

;       ACQUIRE.ASM
;       This file contains the code that is used by the
;       workstation to acquire the Video Bus and transmit an image.
;       Use : call ACQUIRE
;       Input : Register 4 = current station value
;       Returns : None
;       RAM Usage : None
;       Register Usage : ACC - destroyed
;                        Register 1 - Comm ERROR counter
;       Subroutines :
;       Created : 88.11.12  Greta L Light
;       Revisions : None
;       SET SUBTITLE FOR THIS SECTION OF CODE
```

$SUBTTL ACQUIRE.ASM

ACQUIRE:
;    SET ERROR COUNTER
    mov r1,#05H ;the system will try to acquire
       ;five times
;    READ BUSY FLAG
    movx a,@r0  ;clear output latch
    ins a,bus    ;ACC = system port
    jb7 ACQ1    ;if system is not busy, jump
    ret         ;if busy, return and do not ACQUIRE
;    TURN ON BUSY LED
ACQ1:    orl p2,#INHIGH    ;make I/O* high to enable LED port
    mov a,#BUSYON   ;get code to turn on BUSY LED
    anl a,r3    ;set condition in LED register
    mov r3,a    ;restore LED register
    outl bus,a    ;write to LED latch
;    TURN ON CHANNEL and ENABLE RED VIDEO
    orl p2,#CHANON  ;enable channel
    orl p2,#REDEN    ;enable red video
;    delay one and a half seconds for channal to stabilize
    call W500MS ;delay .5 sec
    call W500MS ;delay .5 sec
    call W500MS ;delay .5 sec
;    WRITE STATION TO OUTPUT LATCH
ACQ1A:    anl p2,#OUTLOW  ;enable output latch
    mov a,r4    ;get station address from register 4
    outl bus,a    ;write to output latch
;*****
;    WAIT FOR START OF VERTICAL SYNC PERIOD
ACQ2:    jt1 ACQ2    ;wait for VS to go low
;    TURN ON TRANSMIT ENABLE
    orl p2,#10H ;make XMIT EN high

```
        nop nop nop
;*****
;       WAIT FOR END OF VERTICAL SYNC PERIOD
ACQ3:   jnt1 ACQ3       ;wait for VS to go high
;*****
;       WAIT FOR CS TO GO LOW
ACQ4:   jt0 ACQ4    ;wait for cs to go low
        nop             ;TRANSMIT PERIOD
        nop
;       TURN OFF XMIT
        anl p2,#0EFH    ;disable transmit
;*****
;       WAIT FOR CS TO GO LOW
ACQ4B:  jt0 ACQ4B       ;wait for cs to go low
        nop             ;NOP PERIOD
;       ENABLE RECV
        orl p2,#20H ;turn on receive
;*****
;       DELAY one CS PERIOD
ACQ4A:  jt0 ACQ4A       ;delay of one CS period
                        ;RECEIVE PERIOD
;       READ FRONT PANEL CONTROLS
        in a,p1         ;read controls
        outl bus,a    ;latch front panel control into output latch
;       TURN OFF RECEIVE
        anl p2,#0DFH    ;get code to turn off receive
;       ENABLE XMIT
        orl p2,#50H ;enable transmit
;       WAIT FOR CS TO GO LOW
ACQ5:   jt0 ACQ5    ;wait for cs to go low
```

```
            movx @r0,a    ;clear input latch
;       TURN OFF RECV AND XMIT
            anl p2,#0CFH   ;write code to port 2
;       WAIT FOR NEXT CS PERIOD
ACQ6:       jt0 ACQ6
;       READ INPUT PORT
            ins a,bus      ;read echo from Main controller
            mov r0,a       ;save echo
            anl a,#MASKLOW ;mask the echo station
            xrl a,r4       ;compare with station
            jz ACQ7        ;station is correct, jump and continue
;       STATION TRANSMISSION ERROR
            orl p2,#INHIGH ;enable led latch
            mov a,#ERRON   ;get code to turn on error led
            anl a,r3       ;set condition in LED register
            mov r3,a       ;restore LED register
            outl bus,a     ;write to LED latch
            djnz r1,ACQ1A  ;continue to try to acquire
            mov a,#INITP2  ;get initial conditions for port 2
            outl p2,a      ;reset port 2
            ret            ;too many errors, return
;       TEST ECHO FOR HALT
ACQ7:       mov a,r0       ;restore echo into acc
;           jb7 ACQ8       ;this is not a halt command, jump
;       HALT ACQUIRE
;           mov r3,#LEDOFF ;turn off all LEDs
;           mov a,r3       ;get led code from register
;           outl bus,a     ;write to led latch
;           mov a,#INITP2  ;get initial conditions for port 2
;           outl p2,a      ;reset port 2
;           ret
;       CHECK for VALID CHANNEL ENABLE
```

```
ACQ8:      jb4 ACQ9    ;If high, RED is Disabled -jump
           mov a,#43H ;get code to enable red video
           outl p2,a    ;output code to port 2
           jmp ACQ1A ;continue to transmit image
ACQ9:  jb5 ACQ10       ;If high, Green is Disabled - jump
           mov a,#45H ;get code to enable green video
           outl p2,a    ;output code to port 2
           jmp ACQ1A ;continue to transmit image
ACQ10:     jb6 ACQ11   ;If high, video is complete, exit
           mov a,#49H ;get code to enable blue video
           outl p2,a    ;output code to port 2
           jmp ACQ1A ;continue to transmit image
ACQ11:     mov r3,#0FBH    ;enable "ok to BIS led"
           mov a,r3     ;get led status
           outl bus,a   ;write to led latch
           mov a,#01H ;set code to turn on BIS OK Flag
           orl a,r2     ;turn on BIS OK Flag in register 2
           mov r2,a     ;restore flag status register
           mov a,#INITP2    ;get initial conditions for port 2
           outl p2,a    ;reset port 2
;     Done
           ret          ;return to STATION
;***********************
; End of ACQUIRE
;***********************

================================

;     WAIT.ASM
;     This following code is used to generate timing delays
;     by use of the on board timer/event counter. The external
;     11 MHz crystal is used as the time base for the internal
```

; counter. The 11 MHz signal is first divided by fifteen
; and again by 32 before being input into the counter.
; This provides for a counter clocking frequency of 22.92 KHz.
; Incrementing the clock every 43.64 uS approximately. The
; counter is an 8-bit counter providing a maximum count of
; 256. Therefore the counter will overflow and set its flag once
; every 11.17 mS.
; To set a delay for one-half of a second, the loop
; counter is to be set to 45 counts. This will actually
; result in a delay of .5027 seconds.
; Use: Call W500MS ;half second delay
; Input: None
; Returns: None
; RAM Usage: None
; Register Usage: ACC - Destroyed
;                 r7 - Destroyed
; Subroutines: None
; Created : 88.11.13   Greta L Light
; Revisions : None

```
W500MS:  mov r7,#45   ;set loop counter for .500 sec delay
         jmp WT0
;        DELAY FOR LENGTH OF LOOP COUNTER
WT0:     stop tcnt    ;stop timer/counter
         clr a        ;clear accumulator
         mov t,a      ;event counter = 00
         jtf WT1      ;clear timer flag
WT1:     strt t       ;start timer
WT2:     jtf WT3      ;jump if 20 ms timer overflow
         jmp WT2      ;wait for timer overflow
WT3:     djnz r7,WT2  ;decrement loop counter
;        DELAY COMPLETE, RETURN
```

```
stop tcnt      ;stop timer ret            ;return
```

```
;    BIS.ASM ret
```

I claim:

1. Apparatus for connecting a plurality of video signal sources to a plotter, each said source providing a set of separate R, G and B signals representing an image, comprising:
   a. a bus comprising a coaxial cable;
   b. a respective video chain unit connected to each said source for receiving video signals and connected in series in said bus, comprising:
      i. means for detecting a user command to transmit video information to be plotted;
      ii. means for transmitting on said bus, in response to said user command, a ready signal indicating that said video chain unit is ready to transmit video information;
      iii. means for detecting a send command on said bus; and
      iv. means for sequentially transmitting on said bus, in response to said send command, the R, G and B video signals from said source; and
   c. a video processor unit connected to said plotter and connected in series in said bus, comprising:
      i. means for detecting said ready signal on said bus;
      ii. means for transmitting on said bus, in response to said ready signal, a send command indicating that said video processor unit is ready to receive video information;
      iii. means for sequentially receiving R, G and B video signals transmitted on said bus; and
      iv. means for converting the sequentially received R, G and B video signals to a signal format recognizable by said plotter.

2. The apparatus of claim 1, wherein said ready signal comprises a station identification signal.

3. The apparatus of claim 2, wherein said station identification signal uniquely identifies the video chain unit from which it is transmitted.

4. The apparatus of claim 3, wherein said send command comprises an echo of said station identification signal.

5. The apparatus of claim 1, wherein each said video chain unit further comprises means for transmitting to said video processor unit via said bus a signal indicative of selected plot parameters.

6. The apparatus of claim 1, wherein each said video chain unit further comprises means for transmitting to said video processor unit via said bus a signal indicative of the number of copies of an image to be plotted.

7. The apparatus of claim 1, wherein each said video chain unit further comprises means for applying a busy signal to said bus indicating that said bus is in use.

8. The apparatus of claim 7, wherein each said video chain unit further comprises means for detecting a signal on said bus indicating that said bus is in use, and disabling transmission of said ready signal for the duration of said busy signal.

9. The apparatus of claim 1, wherein said video processor unit and each of said video chain units includes a through-loop connected in series in said bus.

10. The apparatus of claim 9, wherein said through-loops are connected in series by a single-conductor coaxial cable to form said bus.

11. The apparatus of claim 1, wherein each said video processor unit further comprises: means for storing format information indicative of the format of said R, G and B video signals, and means for retrieving said format information upon receipt of a ready signal from one said video chain unit, and wherein said converting means comprises means for converting the sequentially received R, G and B video signals in dependence on said stored format information.

12. The apparatus of claim 1, wherein said send command comprises a digital signal and a clock signal transmitted during a horizontal line interval of said video signals, and wherein said means for detecting a send command comprises a shift register, means for detecting said clock signal and means employing said detected clock signal to clock said digital signal into said shift register.

13. The apparatus of claim 1, wherein said means for transmitting a ready signal comprises means for transmitting on said bus a digital signal modulated with a clock signal during a horizontal line interval following a vertical sync interval of said video signals.

14. The apparatus of claim 13, wherein said means for detecting said ready signal comprises a shift register, means for detecting said clock signal and means for employing said detected clock signal to clock said digital signal into said shift register.

15. The apparatus of claim 1, wherein at least one said video chain unit further comprises means for receiving from a serial data signal source a serial data signal representing an image to be plotted and means for transmitting said serial data signal on said bus, and wherein said video processor unit comprises means for receiving said serial data signal on said bus.

16. The apparatus of claim 1, wherein at least one said video chain unit further comprises means for receiving from a parallel data signal source a parallel data signal representing an image to be plotted and means for converting said parallel data signal to a serial data signal, and means for transmitting said serial data signal on said bus, and wherein said video processor unit comprises means for receiving said serial data signal on said bus.

* * * * *